Nov. 30, 1965  M. H. F. GIOT ETAL  3,221,149
METERING AND COMPUTING APPARATUS
Filed April 25, 1962  15 Sheets-Sheet 1

INVENTORS
MAURICE HENRI FERNAND GIOT, BERNARD JOBART,
CHARLES ROGER FEVROT, JEAN MEYER
BY
ATTORNEYS

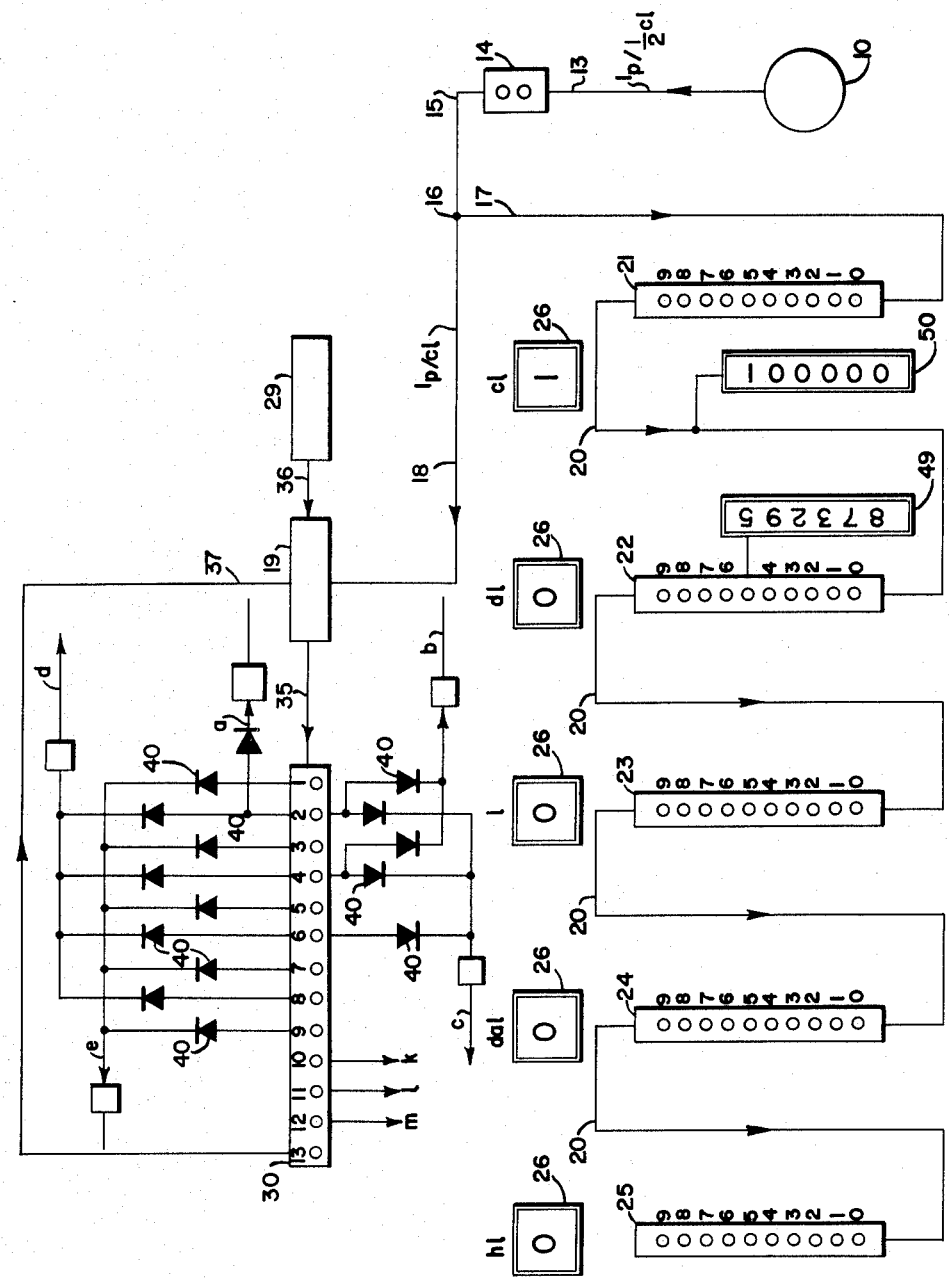

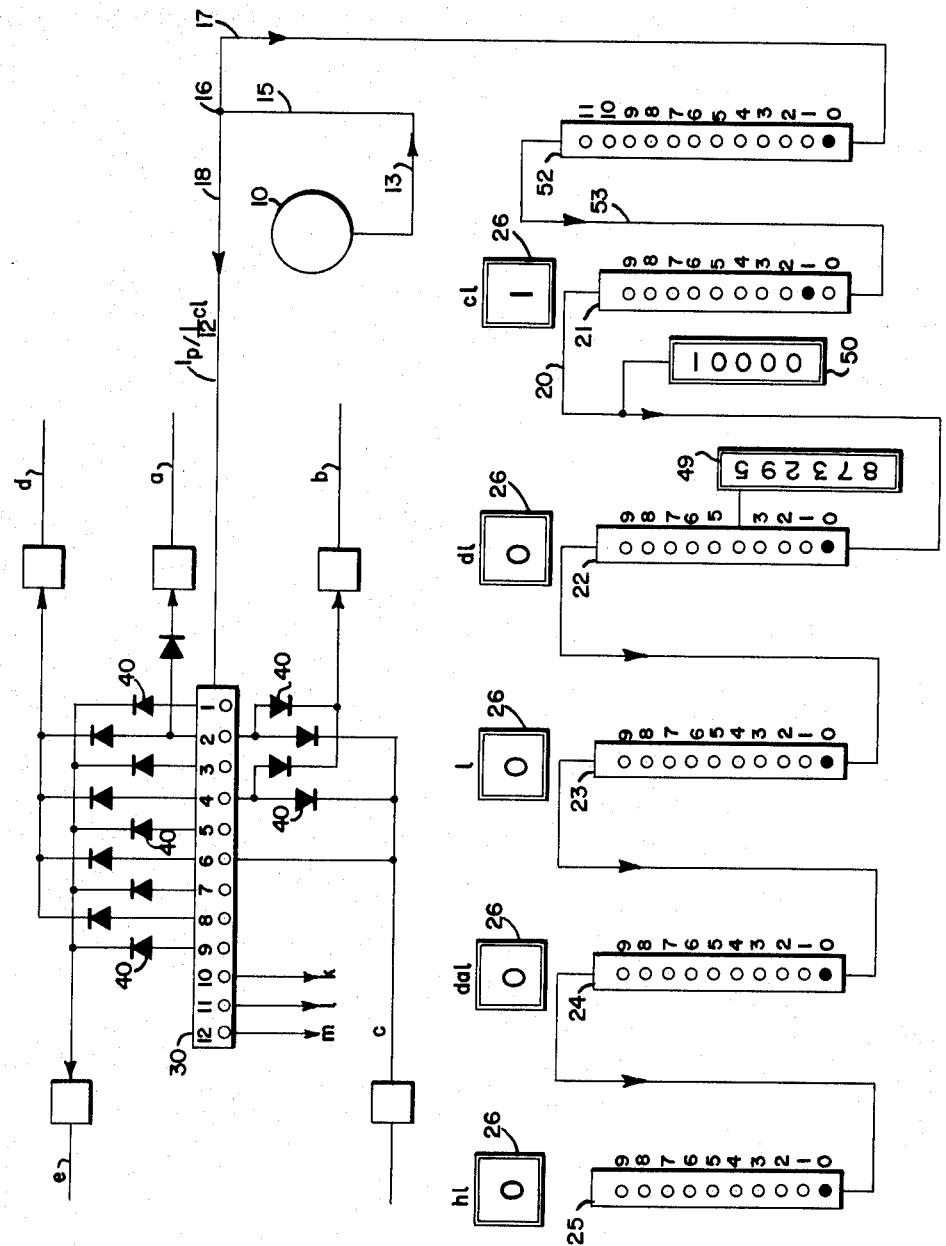

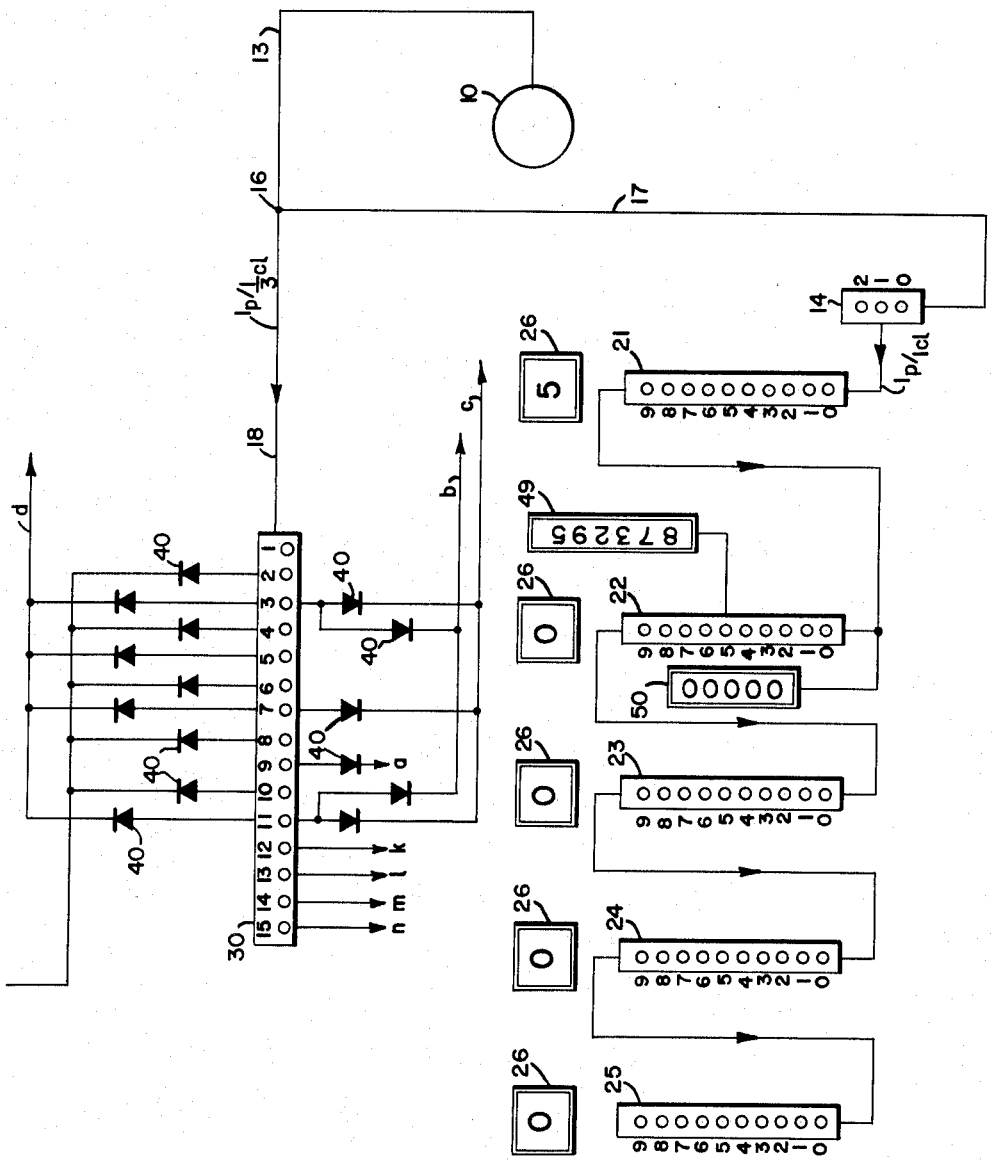

Nov. 30, 1965        M. H. F. GIOT ETAL        3,221,149
METERING AND COMPUTING APPARATUS
Filed April 25, 1962                15 Sheets-Sheet 13

INVENTORS
MAURICE HENRI FERNAND GIOT, BERNARD JOBART,
CHARLES ROGER FEVROT, JEAN MEYER
BY
ATTORNEYS

Nov. 30, 1965   M. H. F. GIOT ETAL   3,221,149
METERING AND COMPUTING APPARATUS
Filed April 25, 1962   15 Sheets-Sheet 14

INVENTORS
MAURICE HENRI FERNAND GIOT, BERNARD JOBART
CHARLES ROGER FEVROT, JEAN MEYER
BY
ATTORNEYS

Nov. 30, 1965  M. H. F. GIOT ETAL  3,221,149
METERING AND COMPUTING APPARATUS
Filed April 25, 1962  15 Sheets-Sheet 15
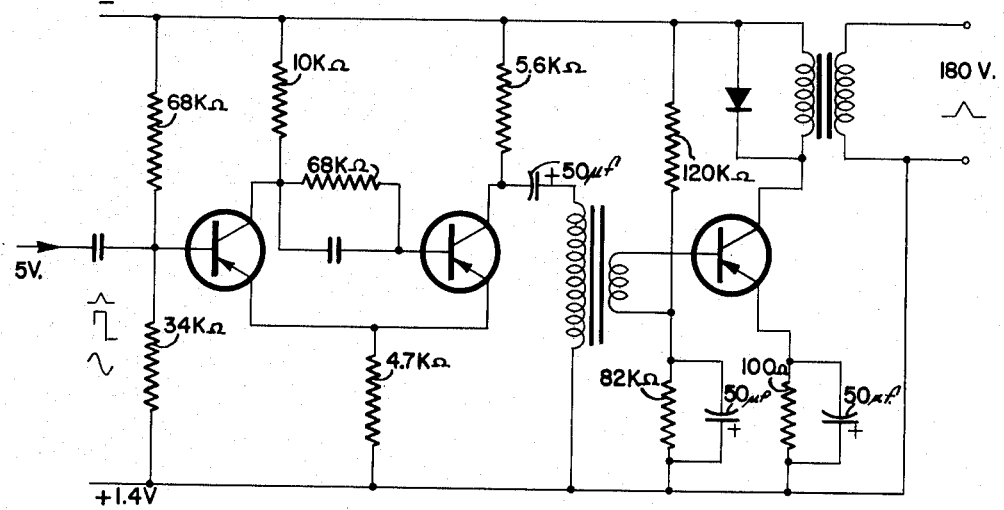
FIG. 12
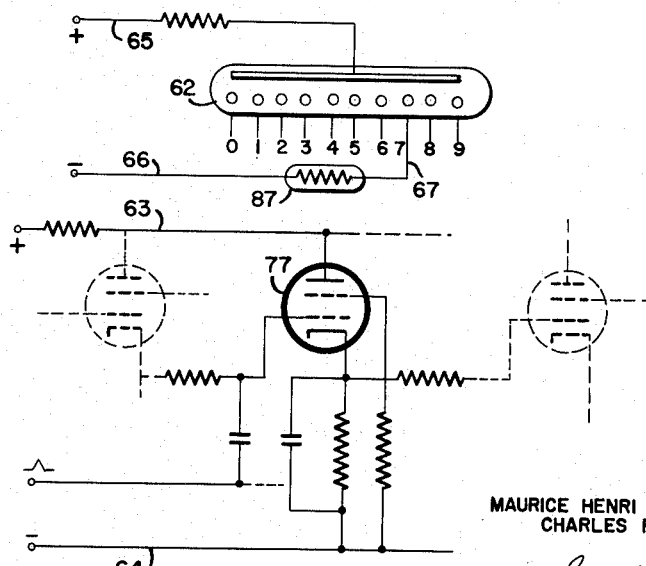
FIG. 13
FIG. 14
INVENTORS
MAURICE HENRI FERNAND GIOT, BERNARD JOBART,
CHARLES ROGER FEVROT, JEAN MEYER
BY
ATTORNEYS United States Patent Office 3,221,149
Patented Nov. 30, 1965

3,221,149
METERING AND COMPUTING APPARATUS
Maurice Henri Fernand Giot, Bernard Jobart, and Charles Roger Fevrot, Paris, and Jean Meyer, Neuilly-sur-Seine, France, assignors to S.A.T.A.M., Societe Anonyme Pour Tous Appareillages Mecaniques and Sud-Aviation, Societe Nationale de Constructions Aeronautiques, both of Paris, France, both companies of France
Filed Apr. 25, 1962, Ser. No. 190,151
Claims priority, application France, Apr. 26, 1961, 859,950
4 Claims. (Cl. 235—92)

The present invention relates to an automatic metering apparatus wherein there is provided for the benefit of the user a visual indication of the measured quantity, such as the weight or volume thereof, and of a quantity proportional thereto which is a function of a property of the material measured, e.g., its density or the unit volume price, said indication being actuated electrically. The apparatus in accordance with the invention lends itself particularly well to use as a fluid dispenser and, in accordance with a preferred embodiment of the invention, as a motor-fuel dispenser.

Motor-fuel dispensers in which the volume of liquid dispensed and the price of the volume so dispensed are automatically displayed as the delivery proceeds are in common use. Such dispensers generally operate by means of rather complex mechanisms whose elements are necessarily located side by side since the various transmissions are mechanical.

To separate the various elements, it has been proposed to substitute electronic means for the mechanical arrangements and, particularly, to insert in the outlet pipe between the pump and dispensing hose a volumetric meter driving two disks which produce, by means of photoelectric cells, two distinct series of pulses, one fed to the price-display device, the other to the dispensed-volume display device.

With such an arrangement however the price-display control disk must be replaced whenever the unit price or selling price of the fuel changes, and this makes it necessary to dismantle the explosion-proof casing in which the disk is housed and to install a disk corresponding to the new price, which must be on hand.

Moreover, the unit selling price displayed is not positively coupled to the generated sales price. Hence the possibility of cheating—the disk driven by the volumetric meter may not correspond with the unit price displayed.

To minimize these drawbacks, a single pulse-transmitting device might be incorporated in the dispenser, the pulses being produced as a function of the volume dispensed and actuating both a volume-display device (consisting of a pulse totalizer) and a price-display device consisting of a totalizer operating on the same principle and adding after each volume pulse a number of pulses equal or proportional to the unit selling price. However, if in this case the volume-pulse transmitter were to send one pulse per centiliter and the unit selling price of the fuel were a four-digit number, as it might be in some countries, the price totalizer would have to be capable of receiving 9,999 pulses after each volume pulse. Since present-day pumps deliver about one liter per second, the price totalizer would have to be able to receive and count 1,000,000 pulses per second. And even if the pulse transmitter were to send only one pulse for every five centiliters, the totalizer would have to be capable of receiving and counting 200,000 p.p.s.

Such arrangements necessitate the use of high-frequency tubes, which at present are very costly. With the present state of the art, it is therefore preferable to stay in the low-frequency region, which will make for simpler circuit configurations and lower costs.

The dispenser in accordance with the present invention is an automatic dispenser of fluid, and particularly of fuel, wherein the continuous display of numerical information for the buyers' benefit concurrent with the delivery of the product is actuated electrically, the dispenser being capable of stopping automatically when a predetermined quantity or price is reached, characterized by the fact that it comprises a single-channel transmitter producing a series of pulses whose number is a function of the volume dispensed. These pulses actuate on the one hand a device indicating the volume dispensed, comprising a pulse totalizer constructed for example of ring counters using ten-position electron tubes, hereinafter called decades, each decade corresponding to an arithmetic order (units, tens and hundreds, for example). The individual decades are connected in cascade so that the lowest-order decade receives all pulses, the other decades receiving only the carry from the decade of the next lower order, that is, one pulse every time that the lower-order decade completes a cycle. Each of said decades is further connected to a means for providing a visual indication of the total number of pulses received by the volume-pulse totalizer and hence of the volume dispensed. These decades further actuate a device displaying the amount payable for the volume dispensed. This device, which indicates the result of multiplication of the volume dispensed by the unit selling price, comprises an array of decades composed of at least as many decades as the maximum amount payable has digits. Each of these decades corresponds to an arithmetic order (units, tens and hundreds, for example). These decades are cascaded so that each receives a pulse when the decade of the next lower order has completed its cycle, and all or some of them are fed individually, in accordance with their arithmetic order, a number of pulses fixed as a function of the unit selling price by a device hereinafter called pulse distributor.

The pulse distributor may be advantageously formed of a ring counter comprising a plurality of electron tubes connected to as many groups of switches as the unit selling price of the fluid or fuel may have digits, each switch group corresponding to an arithmetic order and having one of its elements connected to the decade of corresponding order in the price totalizer. The ring counter may receive either directly the series of volume pulses or a train formed of a fixed number of pulses delivered by a pulse generator between the individual volume pulses.

The accompanying drawing, given by way of example, will provide a better understanding of the invention.

FIGS. 1a and 1b are a schematic diagram of the read-out devices in accordance with the present invention.

FIGS. 2a and 2b are a schematic diagram of a first modification of the embodiment of FIGS. 1a and 1b.

FIGS. 4a and 4b are a schematic diagram of a third modification of the embodiment of FIGS. 1a and 1b.

FIG. 12 is a diagram of a pulse-forming network of known type.

FIG. 13 illustrates a modification of the connections between the ring-counter tubes and an indicator lamp.

FIG. 14 is a detail view of the mounting of a tube in accordance with the modification shown in FIG. 13.

Figure 8:
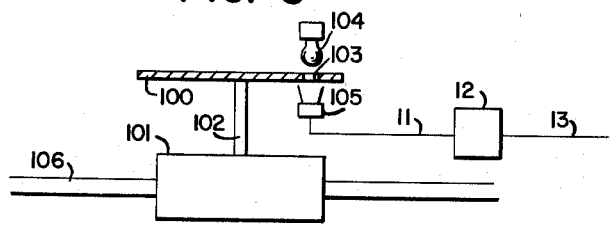
FIG. 8 illustrates an embodiment of a pulse transmitter producing pulses as a function of the volume dispensed.

The dispenser of the present invention comprises a liquid conduit in which a volumetric meter is inserted, as for example in the manner shown in FIG. 8, and to which a pulse-transmitting device or pulse pickup 10 is connected. This transmitter, connected to the volumetric meter, delivers pulses over a single output channel 11 at a rate proportional to the volume of liquid passing through said meter (FIG. 1b).

The pulse-transmitting device may be constructed, in accordance with the embodiment shown in FIG. 8, of a disk 100 that is mechanically driven by the meter 101 through a shaft 102. The disk 100 is divided into a given number of alternately opaque and transparent sectors 103, located between a light source 104 and a photoelectric cell 105. When the disk 100 rotates, driven by shaft 102, a pulse is produced by the photocell whenever a transparent sector 103 moves in front of light source 104.

The transmitting device may be designed in any other manner known to persons skilled in the art to produce pulses at a rate proportional to the volume dispensed.

Specifically, the pulse-transmitting device may consist of a turbine-type volumetric meter generating a fixed number of pulses at every revolution by any suitable means, for example, by means of one or more magnets mounted on the shaft of the turbine-type rotor.

The pulses produced by the pickup 10, which are of more or less regular configuration, are fed through a pulse-forming network 12 (FIG. 8) of conventional design, which shapes the short pulses of more or less regular configuration produced by photocell 105 into pulses which are delivered over line 13 and which are of constant characteristics irrespective of the frequency of their generation.

Pulse-forming networks are distributed in like manner throughout the circuit. The need for this arises from the fact that whenever a pulse is used, it is deformed; and whenever a pulse so distorted is to be re-used, a pulse-forming network similar to the one shown in FIG. 12 is provided. To keep the diagram uncluttered, these pulse-forming networks are not shown in the rest of the circuit or specifically mentioned in what follows unless they have a particular effect on the circuitry; nor will they be described since they are known to the art.

The various computing devices shown in FIGS. 1a and 1b, which will be described later, are designed to operate on one pulse for every centiliter dispensed. If the number of transparent sectors 103 of the disk 100 of pickup 10 is such that the photocell produces one pulse per centiliter (cl), the error between two successive deliveries will be ±1 cl, that is, 2 cl. Since this error might prove intolerable, the number of transparent sectors 103 of disk 100 is such that photocell 105 produces one pulse for every half-centiliter dispensed, the maximum error between two deliveries thus being reduced to 1 cl.

Since for the reasons of accuracy outlined above the pickup 10 produces one pulse per half-centiliter, a frequency divider 14 is inserted in line 13 to restore the pulse rate to one pulse per centiliter dispensed.

The frequency divider 14 may comprise any of the bistable devices conventionally employed in electronic equipment, and particularly a two-tube ring counter using cold-cathode tubes, for example. When an input pulse is applied to one of the tubes, which we shall assume to be in the ionized condition, this tube fires and the other tube extinguishes and is pre-ionized. The next incoming pulse then fires the ionized tube and extinguishes the first tube, at the same time pre-ionizing it. This process is repeated over and over again, every input impulse igniting the ionized tube and first extinguishing and then pre-ionizing the other tube. Whenever the first tube fires, a pulse passes through the single output channel 15. Thus, the output delivered by frequency divider 14 over line 15 is but one pulse for every two pulses received by it through channel 13. In other words, while in the embodiment under discussion the pickup 10 transmits one pulse every half-centiliter, only one pulse per centiliter is channeled over line 15.

The volume pulses delivered by frequency divider 14 through channel 15 pass at a junction 16 over line 17 to the dispensed-volume totalizing device and also over line 18 to the amount-payable computing device.

Over line 17, the volume pulses actuate a display device for the volume dispensed, which directly totalizes the pulses coming from the transmitting unit 10 and which comprises an array of decades 21, 22, 23, 24 and 25, each decade corresponding to an arithmetic order. These decades are connected in cascade so that all incoming pulses are applied to the lowest-order decade, 21, the other decades receiving only the carry from the decade of the next lower order.

Figure 9:
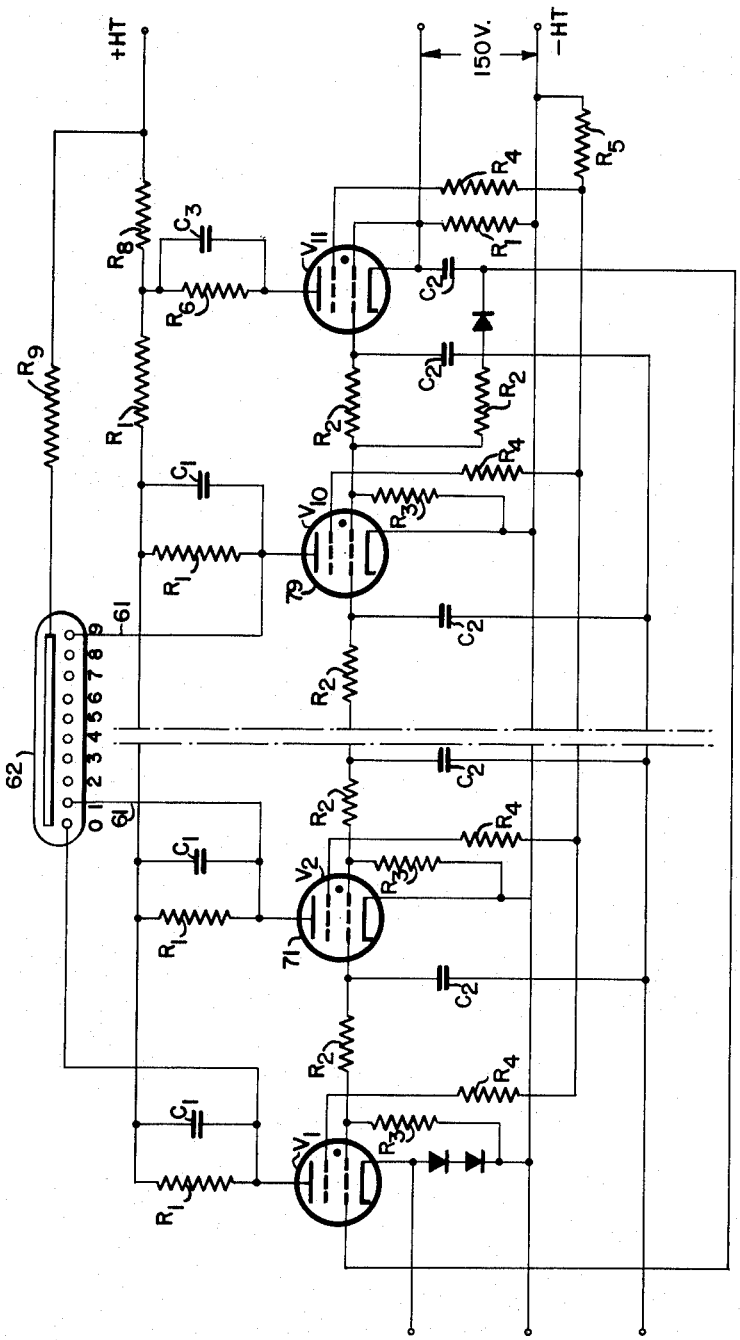
FIG. 9 is a diagram of a ring counter employing ten-position cold-cathode tubes.

The term decade is here used to denote a known type of ring counter employing ten-portion electron tubes and constructed, for example, as shown in FIG. 9.

For the sake of simplicity and convenience, the ring counters are represented in FIGS. 1 to 5 schematically by small rectangles, with each small circle denoting an electron tube.

Figure 1A:
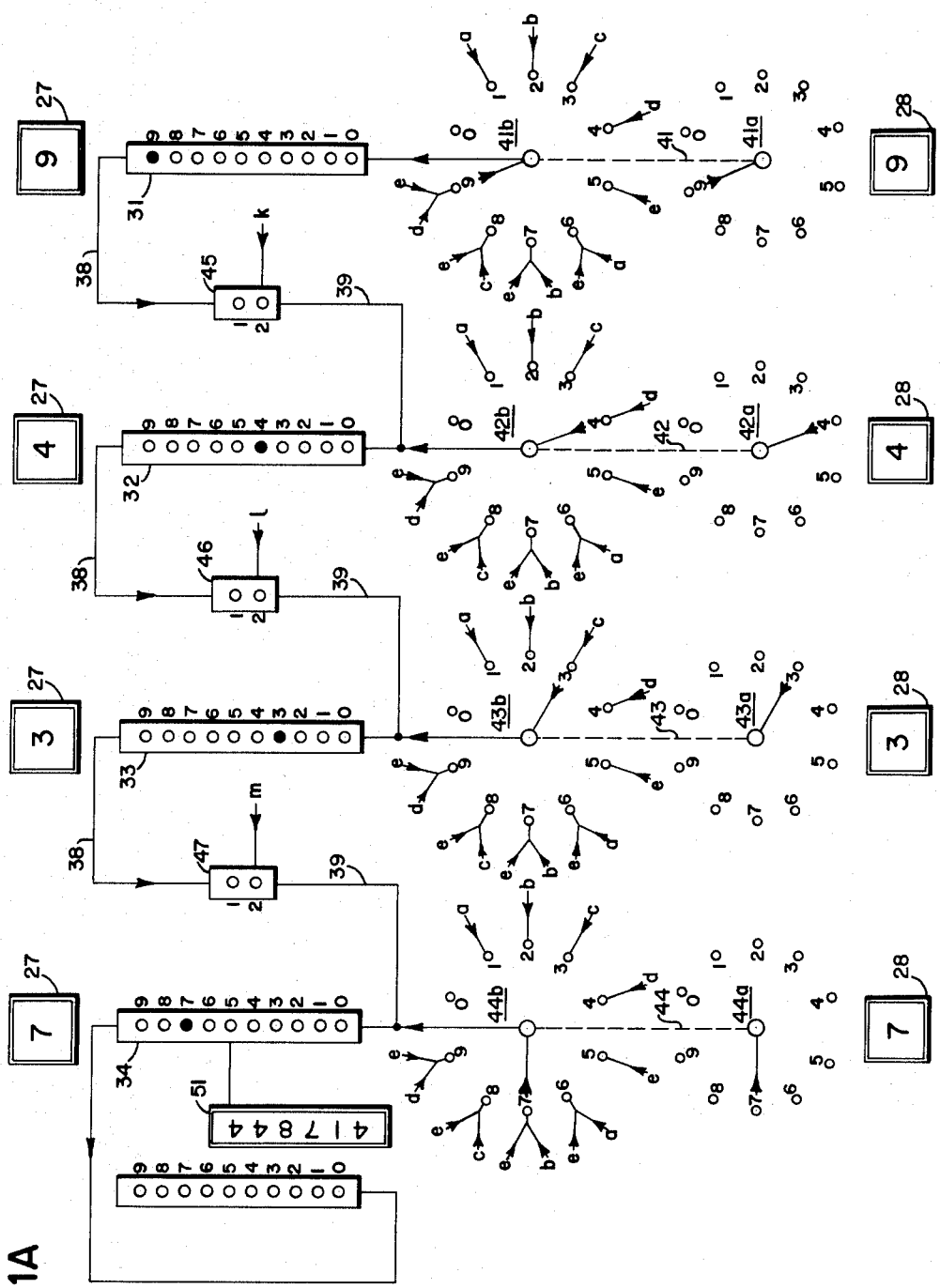

Referring now to FIGS. 1a and 1b it will be seen that the volume-pulse totalizer comprises decades 21, 22, 23, 24 and 25. Decade 21 corresponds to centiliters, decade 22 to deciliters, decade 23 to liters, decade 24 to decaliters, and decade 25 to hectoliters.

These decades operate much like the frequency divider 14. That is, each incoming pulse ignites the tube which was pre-ionized by the preceding pulse, extinguishes the tube fired before, and pre-ionizes the next tube.

The volume pulses are all fed to decade 21 over line 17 and thus fire the ten tubes of decade 21 in succession. The tenth pulse applied to decade 21 is fed to the first of the ten tubes of decade 22 over line 20, and decade 21 restarts its cycle. Thus, decade 22 receives a pulse only each time decade 21 has received ten pulses; and decade 23 receives only one pulse for every 10 received by decade 22 or for every 100 received by decade 21. Decade 24 receives only one pulse for every 1,000 received by decade 21, and decade 25 only one pulse for every 10,000 received by decade 21.

Figure 10:
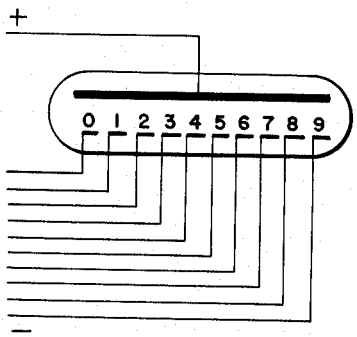
FIGS. 10 and 11 are respectively a diagram and a view in side elevation of an indicator lamp of known type.
Figure 11:
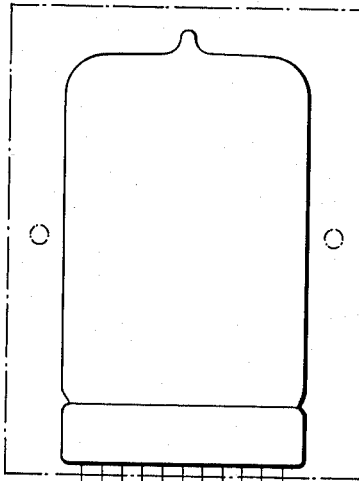

Each of decades 21, 22, 23, 24 and 25 is connected to a readout device of a known type, which may advantageously consist of an indicator lamp displaying at windows 26 the numeral of the tube to which a pulse is being applied, as shown by way of example in FIGS. 10 and 11.

The number of pulses fed over line 17 is thus visually indicated; and since these pulses are equal in number to the centiliters delivered, the quantity dispensed may be read directly from the windows 26, a separate one of which is associated with each of decades 21 to 25.

The volume pulses are simultaneously routed over line 18 to actuate the amount-payable display device comprising decades 31, 32, 33 and 34, each of which corresponds to an arithmetic order, and which are cascaded so that the carry from a lower-order decade is passed to the next-higher-order decade, each decade, however, being fed a number of pulses fixed in accordance with its arithmetic order by a pulse distributor, formed of ring counter 30 and switch groups 41, 42, 43 and 44, on the basis of the selling price per unit volume of product dispensed.

The pulses routed over line 18 pass to an electronic gate 19. The term "electronic gate" here means a device known per se which passes to a channel 35 a continuous series of pulses delivered over a channel 36 by a pulse generator 29 whenever a pulse is fed to said device over line 18, and which interrupts the transmission of said series of pulses over channel 35 whenever it receives a pulse over channel 37. In other words, the device 19 operates as its name implies, in the manner of a gate that is opened by a pulse coming in over line 18 and that is closed by a pulse received over line 37, and which when opened allows the passage of the pulses generated continuously by pulse generator 29.

Pulse generator 29 generates pulses continuously.

When electronic gate 19 is opened, the pulse output of generator 29 is fed through line 35 to ring counter 30. These pulses cause the thirteen tubes of ring counter 30 to ignite in succession. The last pulse received by said ring is returned through channel 37 to gate 19, closing it and thus interrupting transmission over line 35 of the pulses produced continuously by pulse generator 29.

The output rate of pulse generator 29 must be such that the cycle of ring counter 30 is completed in the minimum time interval between two consecutive volume pulses coming in over line 18.

Switch groups 41, 42, 43 and 44 are each composed of a main switch or pointer 41a, 42a, 43a and 44a and auxiliary switch 41b, 42b, 43b and 44b. The main switch and the auxiliary switch of each group are ganged together, being fixed to a common shaft, so that their moving members are at all times positioned in unison.

Each switch group is provided to set up one of the significant digits of the unit-volume price of the product dispensed. Each may be connected to a display device of a known type such as an indicator lamp displaying in a window 28 the digit set up at that switch group. Thus, in the embodiment represented by FIGS. 1a and 1b the index or pointer of main switch 41a is set to position 9, with the digit 9 appearing in window 28, and the wiper or movable contact of auxiliary switch 41b is also set to position 9. Similarly, the index of main switch 42a is set to position 4, digit 4 being displayed at the associated window 28, and the wiper contact of auxiliary switch 42b is to position 4; the index of main switch 43a is set to position 3, the digit 3 being displayed; the wiper contact of auxiliary switch 43b is set to position 3; the index of main switch 44a is set to position 7, the digit 7 being displayed, the wiper contact of auxiliary switch 44b is set to position 7. In this way, the switches 41a, 42a, 43a and 44a define the numer 7349, representing the unit selling price (for example, 73.49 francs per liter).

The individual tubes of ring counter 30 are connected to the fixed peripheral contacts of the auxiliary switches in such a way that the latter receive no pulse at their position 0, one pulse at position 1, two pulses at position 2, and so forth up to position 9, where nine pulses are received.

The simplest way of making these connections is to connect peripheral contact 1 on each of auxiliary switches 41b to 41d to the first tube of ring counter 30, contact 2 to the first two tubes of ring counter 30, and so on, up to contact 9, which is connected to the first nine tubes of ring counter 30.

However, this construction is costly in that it requires a pulse-forming network at the output of each tube. Besides, it is preferable from the standpoint of signal clarity that pulses transmitted over a given channel be separated as widely as possible to prevent their mixing with one another before being reshaped.

Instead, fine lines or channels a to e are provided which are connected via diodes to appropriate combinations of the tubes in counter 30 so as to receive respectively, one, two, three, four and five pulses on each cycle of counter 30.

For simplicity's sake, the individual channels, a, b, c, d and e are merely indicated in the drawing, and it should be noted that in reality connections are provided between ends to which identical reference letters (a, b, c, d and e) have been assigned.

The preferred connection between the tubes of ring counter 30 and the fixed contacts of the four auxiliary switches 41g to 44b is as follows: Contact 1 is connected to tube 2 by line a and over that lead receives one pulse for each cycle of ring 30. Contact 2 is connected to tubes 2 and 4 by line b and over that line receives two pulses per cycle, these pulses being spaced apart since they are not two successive pulses of the cycle of ring 30. Contact 3 is connected to tubes 2, 4 and 6 by line c and over that line receives three clearly separated pulses per cycle. Contact 4 is connected to tubes 2, 4, 6 and 8 by line d and over that line receives four clearly separated pulses per cycle. Contact 5 is connected to tubes 1, 3, 5, 7 and 9 by line e and over that line receives five pulses distinct from the preceding ones and interpolated timewise with the pulses transmitted over lines a. b. c and d.

The pulse transmission lines a, b, c, d and e are each provided with a pulse-forming network.

Contact 6 of each of the auxiliary switches is connected to lines a and e and thus receives six pulses. Contact 7 is connected to lines b and e, contact 8 to lines c and e, and contact 9 to lines d and e so that contacts 6, 7, 8 and 9 receive respectively six, seven, eight and nine pulses on each cycle of counter 30.

Diodes 40 are preferably provided in each tube output from counter 30 to prevent the parasitic circulation of pulses between tubes, which would interfere with the functioning of the counter.

Each auxiliary-switch contact thus receives a number of pulses equal to its ordinal number as indicated in the drawing. The center contact or wiper of auxiliary switch 41b is connected to decade 31, the center contact of auxiliary switch 42b to decade 32, the center contact of auxiliary switch 43b to decade 33, and the center contact of auxiliary switch 44b to decade 34. Each of these decades is in turn connected to an indicator tube displaying in an associated window 27 the numeral of the tube in that decade to which a pulse has been applied.

The decades 31, 32, 33 and 34 are connected to one another by leads 38 and 39 in the same way that decades 21, 22, 23, 24 and 25 are interconnected by leads 20. Accordingly, whenever tube 0 of decade 31 fires, a pulse is transmitted to the succeeding decade 32; whenever tube 0 of decade 32 fires, a pulse is transmitted to the succeeding decade 33, and whenever tube 0 of decade 33 fires, a pulse is transmitted to decade 34.

It is possible that a pulse may reach one of decades 32 to 34 through one of the leads 38 simultaneously with a pulse coming from one of the switch groups, the two pulses being transmitted by one and the same tube in ring 30 over different channels. To prevent these two pulses from becoming superimposed, which functionally would amount to one of them being suppressed, bistable devices 45, 46 and 47 functioning as storage elements are inserted into the carry lines 38 between adjacent decades. These memory devices may consist particularly of two-tube ring counters. Their operating principles is as follows: When tube 0 of decade 31, for example, is fired, a pulse travels along lead 38 in the direction of decade 32. This pulse reaches storage element 45, fires its second tube and extinguishes its first tube, pre-ionizing it. No pulse passes on from storage element 45 to decade 32, the output pulse of decade 31 being transmittel on to decade 32 over a continuation 39 of lead 38 only when an external pulse comes in over line k and fires the first tube of flip flop 45. This pulse releases a pulse over line 39 and pre-ionizing the second tube of flip flop 45 after extinguishing it, the storage element 45 then being in condition to store another pulse coming from tube 0 of decade 31.

Storage element 45 is discharged by a pulse coming from the tenth tube of ring 30 over line k; storage element 46 is discharged by a pulse coming from the eleventh tube of ring 30 over line l; and storage element 47 is discharged by a pulse coming from the twelfth tube of ring 30 over line m.

The operation of the apparatus shown in FIGS. 1a and 1b is as follows:

When disk 100 (FIG. 8), which has a number of transparent sectors 103 whereby photocell 105 is caused to produce a short pulse for every half-centiliter dispensed, is driven by volumetric meter 102, it sends a short pulse for every half-centiliter over line 11. These pulses, shaped by a pulse-forming network 12, pass over line 13 to frequency divider 14. Frequency divider 14 delivers only one output pulse for every two input pulses, so that for every centiliter dispensed a pulse travels along line 15 to junction point 16.

From point 16, the volume pulses are channeled simultaneously over line 17 and line 18.

The pulses passing over line 17 to decade 21 fire the tubes of decade 21 in succession, thus causing the digits 1, 2, 3 and so forth to be displayed successively in the window 26 which is associated with that decade. After ten centiliters have been dispensed, a pulse is transmitted to decade 22 by tube 9 of decade 21, which then recycles, with tube 1 of decade 22 firing and the digit 1 displayed in the corresponding window 26 while the digits 0, 1, 2 . . . 9 appear successively in the first window 26. If the delivery is 125 centiliters, 125 pulses are sent over line 17 to decade 21, twelve pulses to decade 22, and one pulse to decade 23. On completion of the delivery, tube 5 of decade 21 glows and the digit 5 appears in the corresponding window; tube 2 of decade 22 glows and the digit 2 appears in the corresponding window; and tube 1 of decade 23 glows and the digit 1 appears in the corresponding window.

The number displayed in the various windows 26 is 125, the possible error between this display and the volume actually dispensed being at most ±½ cl.

The pulses travel simultaneously along line 18. The first pulse reaches electronic gate 19 and opens it. The gate so opened allows the passage of the pulses produced by pulse generator 29, which pass over channel 35 to ring counter 30. The first of these pulses delivered by pulse generator 29 ignites tube 1 and extinguishes tube 13, pre-ionizing tube 2, and then passes through lead e to contacts 9, 8, 7, 6 and 5 of all auxiliary switches. The center contact or wiper of 41b is, for the assumed unit price, connected to contact 9, and the pulse is therefore applied to decade 31, where it fires tube 1 and extinguishes tube 0, pre-ionizing tube 2. Since the center contact or wiper of 42b is connected to contact 4, the pulse from the 0-tube of counter 30 is not fed to decade 32; nor is it fed to decade 33, the center contact of 43b being connected to contact 3. But since the center contact of 44b is connected to contact 7, the pulse is channeled to decade 34, where it fires tube 1, extinguishing tube 0 and pre-ionizing tube 2.

The second pulse from pulse generator 29 ignites tube 2 of counter 30 and thus passes through leads a, b, c and d to all contacts of the auxiliary switches except contact 5. Because of the assumed positions of the wipers of switches 41b to 44b, this second pulse is applied simultaneously to all decades, the decade lineup being as follows: Decade 31, tube 2 on; decade 32, tube 1 on; decade 33, tube 1 on; decade 34, tube 2 on.

The third pulse from pulse generator 29 ignites tube 3 of counter 30 which is connected only to lead e, and hence follows the same transmission path at the first, putting the decades into the following positions: Decade 31, tube 3 on; decade 32, tube 1 on; decade 33, tube 1 on; decade 34, tube 3 on. Decades 32 and 33 do not receive this pulse.

Similarly the fourth pulse from pulse generator 29 travels along leads b, c and d but not along lead a. The decades now are in the following positions: Decade 31, tube 4 on; decade 32, tube 2 on; decade 33, tube 2 on; decade 34, tube 4 on.

The fifth pulse from pulse generator 29 is routed over the same path as the first and third and like these is fed to decades 31 and 34 but not to decades 32 and 33. The positions of the decades then are as follows: Decade 31, tube 5 on; decade 32, tube 2 on; decade 33, tube 2 on; decade 34, tube 5 on.

The sixth pulse is only channeled through lines c and d and due to the positions of the wipers of the auxiliary switches applied to all decades, except decade 34, whose positions are now as follows: Decade 31, tube 6 on; decade 32, tube 3 on; decade 33, tube 3 on; decade 34, tube 5 on.

The seventh pulse is fed only to decades 31 and 34, the positions of the decades then being as follows: Decade 31, tube 7 on; decade 32, tube 3 on; decade 33, tube 3 on; decade 34, tube 6 on.

The eighth pulse travels only over line d and therefore does not go to decades 33 and 34, which will not be pulsed again until the next cycle. The decades now are in the following positions: Decade 31, tube 8 on; decade 32, tube 4 on; decade 33, tube 3 on; decade 34, tube 6 on.

The ninth pulse is only applied to decades 31 and 34. The positions of the decades now are: Decade 31, tube 9 on; decade 32, tube 4 on; decade 33, tube 3 on; decade 34, tube 7 on.

The tenth, eleventh and twelfth pulses are fed to the storage elements 45, 46 and 47. Since none of the second tubes of these memory devices has been fired, their first tubes are not pre-ionized, and the arrival of the pulse has no effect.

The thirteenth pulse closes the gate 19 over channel 37, and no further pulses will be coming over channel 35 from pulse generator 29 until the next volume pulse opens the gate again.

When a second volume pulse arrives over line 18, the price totalizer is already indicating the number 7349, which is the price of one unit volume.

When a second pulse comes in over line 18, the cycle of counter 30 is repeated. Decade 31 then receives nine pulses from ring 30, decade 32 four pulses, decade 33 three pulses, and decade 34 seven pulses.

Decade 31 already at position 9 at the end of the first cycle of counter 30, completes its cycle upon receiving one more pulse and delivers a pulse over lead 38. It then repeats its cycle up to tube 8 during the remainder of the second cycle of counter 30. The output pulse of decade 31 is held in storage element 45 until arrival over line k of the tenth pulse in the second cycle of counter 30.

Similarly, decade 32 passes from tube 4 to tube 8 and decade 33 passes from tube 3 to tube 6.

Decade 34 at 7 at the start of the second cycle of counter 30, completes its own cycle after receiving two pulses and delivers one pulse over lead 38 to the next higher-order decade 35, provided for carries, said pulse firing tube 1 of that decade, with decade 34 then recycling up to tube 4 during the remainder of the second cycle of counter 30.

The pulse coming in over line k causes the storage element 45 to discharge, delivering a pulse to decade 32, which shifts to tube 9.

The positions of the decades then are as follows: Decade 31, tube 8 on; decade 32, tube 9 on; decade 33, tube 6 on; decade 34, tube 4 on; higher-order decade 35, tube 1 on.

The number displayed in the readout windows 27 then is 14698, representing 2×7349.

After two volume pulses have passed over line 18, the volume totalizer indicates the number 000.02, and the price totalizer the number 14698, which is the price of two unit volumes.

Thus, the cycle of the ring counter is completed after each volume pulse, and with each cycle the price of a unit volume is added to the price already accumulated.

In the embodiment illustrated, the pulse output rate of pulse generator 29 is such that the cycle of counter 30 is completed in less than 1/100 sec. since the volume pulses may come in over line 18 at the rate of one hundred per second. The amount payable is therefore computed and displayed practically simultaneously with the volume display, and thus the volume and sales price displays are practically synchronized. Moreover, the cycle is at all times completed in 1/100 sec. after the arrival of a volume pulse, which means that the time in which the cycle is completed is independent of the rate of arrival of the volume pulses; in other words, it will not change when for reasons of accurate dispensation the delivery is slowed down.

Three mechanical pulse totalizers 49, 50 and 51 are provided, 51 being associated with the price totalizer, and 49 and 50 with the volume totalizer. These totalizers are conventional drum-type devices and are adapted to be actuated by the pulses traveling along line 20 or line 38 since they are of very small dimensions.

The function of totalizers 49 and 51 is to indicate the total volume dispensed and the total amount paid therefor. In the embodiment illustrated, the mechanical totalizer 49 is designed to count the liters dispensed and is connected to the tube corresponding to one-half liter so that the statistical error will be zero. Totalizer 50 is automatically reset to zero after each delivery and is provided as a standby counter against the possibility of a power failure occurring while a delivery is in progress. It is wired to count deciliters.

After each delivery, the decades and the frequency divider 14 are reset to zero. The zero reset of the decades and of counter 50 is preferably actuated by a switch located on the hook or hanger on which the nozzle of the hose is rested between deliveries so that zero reset takes place when the hose is taken off the hook for a new delivery.

FIGS. 13 and 14 relate to a modification of the apparatus described above. In this embodiment of the invention, the decades 21, 22, 23, 24 and 25 on the one hand and the decades 31, 32, 33 and 34 on the other hand are connected to the indicator lamps for windows 26 and 27, not directly by the connections 61 shown in FIG. 9 but through photoelectric cells responsive to the light output of each of the tubes of these decades.

In FIG. 9, each of the cathodes of the indicator tube 62, which correspond to the digits 0, 1, 2, 3 and up to 9, is connected by a lead to the anode of a separate one of the tubes 70, 71, 72, 73 and up to 79. A more complete description of the ring counter and indicator circuit of FIG. 9 is contained in our copending application Serial No. 175,182 filed February 23, 1962. In FIG. 13 in contrast it will be seen that the tubes of a ring counter such as tube 77 are connected to a source of potential difference through leads 63 and 64, the anodes being connected to lead 63 and the cathodes to lead 64, there being no direct connection between the tubes such as tube 77 and the indicator tube 62, whose anode and cathodes are connected by leads 65 and 66 to a current source different from that which supplies the ring-counter tubes.

Associated with each tube of the ring counter, such as tube 77 for example, is a photocell 87 (of which a single one only is shown) inserted in the lead which connects the cathode forming the corresponding digit of indicator tube 62 (cathode 7 in the example shown) to the general power-supply conductor 66.

When tube 77 ignites, its glow strikes cell 87, which is a photoresistive cell. The ohmic resistance of this cell then drops sharply, and the current intensity in conductor 66 leading to cathode 7 of tube 62 rises abruptly, thus causing the digit 7 to be indicated in tube 62.

A light guide 90 is preferably disposed around each tube 77 for the purpose of directing all of the glow produced by that tube onto the associated cell 87, as indicated in FIG. 14.

Such an arrangement is particularly advantageous as the power output of the ring counter tubes 70, 71, 72 and up to 79 need not then be high enough to trigger the indicator tube 62 as in FIG. 9, which means that lower-power, and therefore less costly, tubes may be used, and these will have a much longer life. Substantial economies are achieved in this way.

Moreover, it has been found in practice that the firing frequency of a tube is inversely proportional to the power output required of it; in other words, the less power a tube has to deliver, the higher its firing frequency will be. Thus, the arrangement illustrated in FIG. 13 permits the firing frequency of the ring counter tubes to be increased considerably.

Such a construction further makes it possible to eliminate all interaction between the indicator tubes and the ring counters in the decades. It has been found that high voltage stability with voltages of about 300 volts is essential to satisfactory operation of the decades. When the tubes thereof are connected directly to the indicator tube, as in the circuit of FIG. 9, the supply voltage must be held constant over a current range of 0 to about 250 milliamps; but when the circuit shown in FIG. 13 is employed, the range of currents over which the voltage must be maintained constant is much narrower, namely, from 0 to about 100 milliamps, the supply for tube 62 requiring no regulation. On the other hand, the successive firing in tube 62 produces no supply-current surges with the arrangement of FIG. 13, which makes for a stable supply current for the decade ring counters. In addition, such a construction eliminates the risk of a malfunctioning indicator tube upsetting the operation of the decade with which it is associated.

The ring counter and indicator tube circuit of FIG. 13 lends itself not only to the embodiment of FIGS. 1a and 1b but also to the embodiments described below.

Figure 2A:
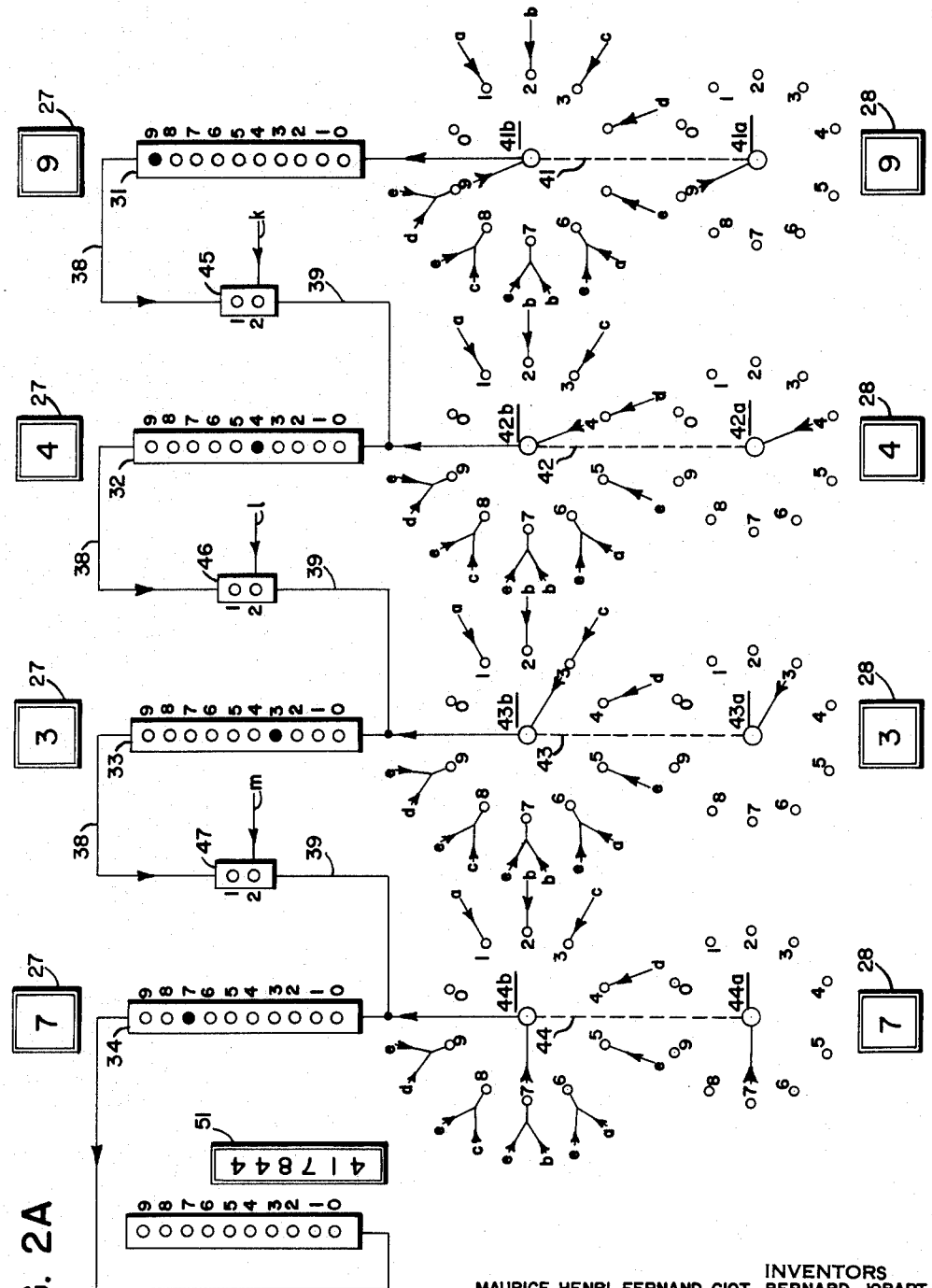

The embodiment shown in FIGS. 2a and 2b is a modificatoion of that shown in FIGS. 1a and 1b, like elements being designated by like reference numerals. In this embodiment of the invention, pulse generator 29 and consequently the gate 19 are dispensed with, and the pulses coming in over line 18 are fed directly to ring counter 30.

Since the counter 30 must of necessity have nine tubes for the channels a, b, c, d and e and three tubes for the channels k, l and m, or a total of twelve tubes, the cycle of this ring is twelve pulses. To assure agreement between the price and volume displays, the pick-up 10 must provide twelve pulses per centiliter, which are then reduced by frequency divider 52 to one pulse per centiliter. Frequency divider 52 is a 12-tube ring counter that is connected between decade 21 and line 17, with tube 0 of ring 52 sending a pulse to decade 21 whenever it fires.

The principle of operation of this device is the same as that of the apparatus of FIGS. 1a and 1b. However, here the visual indication of the price is accurate only at the end of the cycle of counter 30, that is, after every twelve pulses, or after every centiliter dispensed. While counter 30 goes through its cycle, the accumulated price displayed undergoes a minimum of nine and a maximum of twelve changes; but the accumulated volume displayed remains unchanged. Thus, the volume displayed is not synchronized with the price display.

Figure 3A:
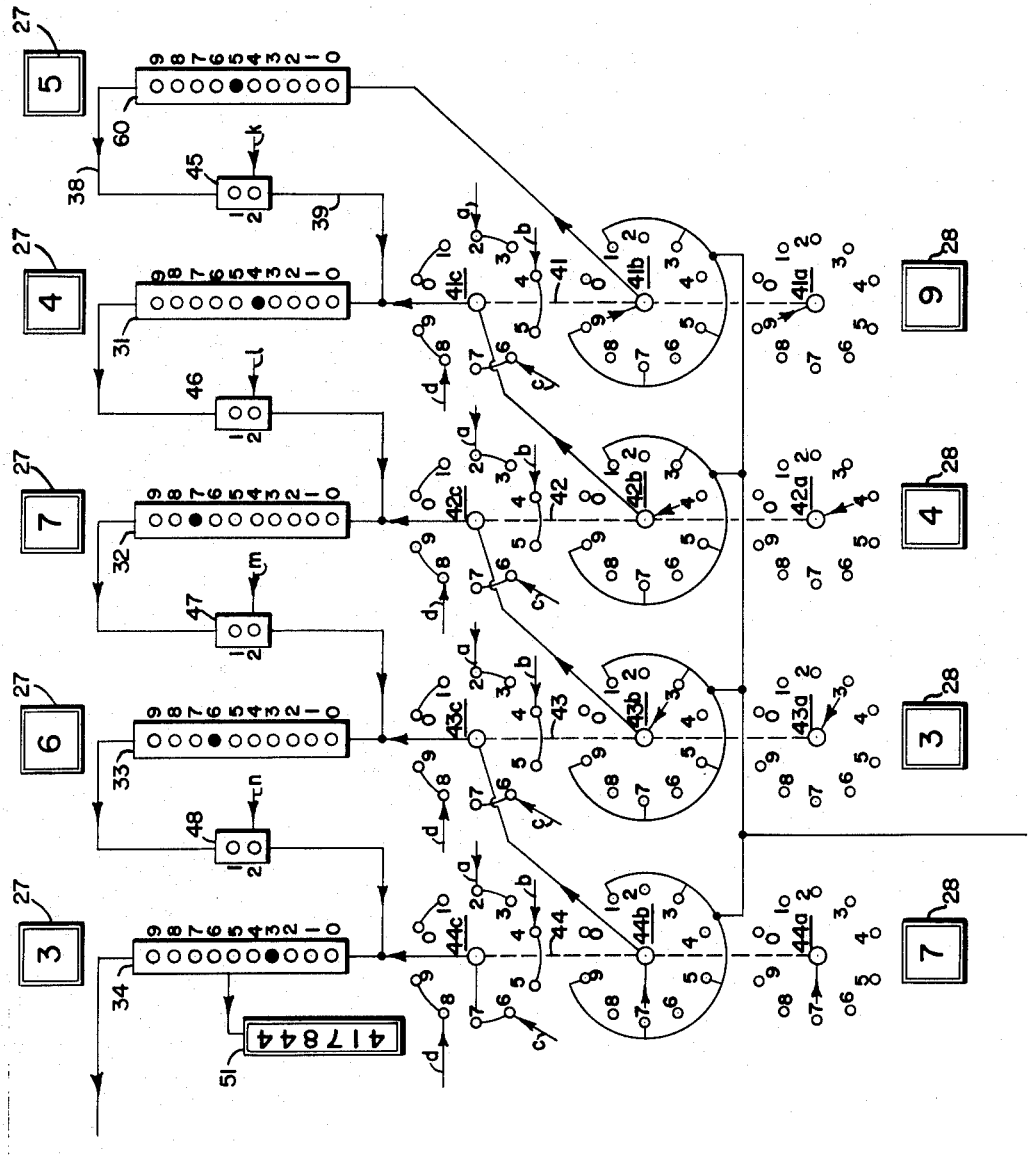
FIGS. 3a and 3b are a schematic diagram of a second modification of the embodiment of FIGS. 1a and 1b.
Figure 3B:
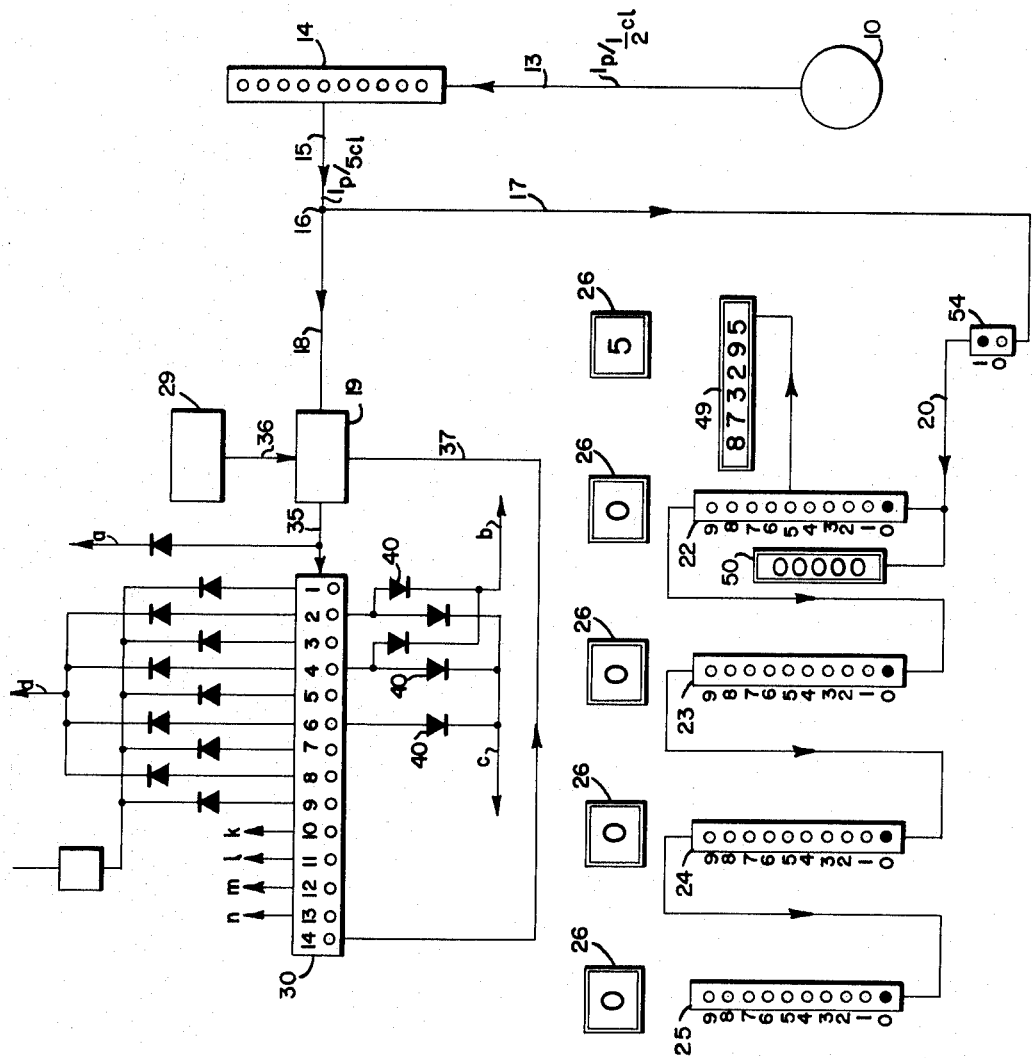

The device represented by FIGS. 3a and 3b is similar to that of FIGS. 1 and 1a. Here, too, corresponding elements have been assigned identical reference numerals. In this edvice, the volume dispensed is indicated in five-centiliter steps.

While under the regulations in effect in some countries the minimum volume unit is the centiliter, other countries require the delivery to be made in multiples of five centiliters. If in that case synchronism is to be established between the volume display in five-centiliter increments and the cumulative price, the price totalizer will have to indicate the corresponding amount whenever the volume totalizer registers the delivery of another unit volume, said amount being the product of multiplication by five of the selling price per unit volume, the latter being required by law to be posted. This multiplication is performed by means of a multiplier incorporated in the pulse distributor, said multiplier comprising advantageously groups of switches connected as described in our copending application Serial No. 189,167 filed April 20, 1962, under the title "Computing Apparatus," and particularly as represented by FIG. 5 of that application.

The pickup 10 of FIG. 3b transmits pulses at the rate of one pulse for every half-centiliter, accuracy being thus maintained within ±½ cl. After being shaped, these pulses are reduced by the 10-tube frequency divider 14 to one pulse for every five centiliters. The pulses are then passed to function point 16.

The pulses transmitted over line 17 are applied to a two-tube ring counter 54, which performs the same function as decade 21 of FIG. 1a but consists of a two-tube ring since it need count the centiliters in 5-cl. increments only. Like decade 21 in FIGS. 1a and 2a it passes one pulse for very ten centiliters to decade 22. The display device associated with ring 54 thus displays only the digits 5 and 0, a display of 5 being shown in FIG. 3b at the window 26 above counter 54.

Over line 18, the volume pulses open the gate 19 and allow a series of pulses to travel along line 35 in the direction of ring 30. The price totalizer here has one decade more than in the preceding embodiments, the reason being that division by two in the case of odd-numbered selling prices entails an additional decimal; and, as shown in the drawing, an extra storage element 48 is provided, controlled over line n by an extra tube in ring 30.

The switch groups 41, 42, 43 and 44 are connected as described in our copending U.S. application Serial No. 189,167, above-identified, and particularly as represented in FIG. 5 of that copending application Serial No. 189,167, i.e., in such a way as to perform the division by two of the number defined by main switches 41a, 42a, 43a and 44a. In fact, multiplication by five is equivalent, with the decimal point shifted one place, to division by two.

In the embodiment illustrated in FIGS. 3a and 3b, pulse generator 29 produces pulses at such a rate that its cycle is completed in less than 1/20 sec. While this is only one-fifth as fast as the pulse repetition rate of the apparatus represented by FIG. 1, the amount payable is computed and visually indicated practically simultaneously with the volume indication so that volume display and price display are synchronized for practical purposes. Besides, a pulse generator 29 may be provided producing pulses at a faster rate. Moreover, as in the case of FIG. 1, once the cycle has been started, it is always completed within the same space of time, regardless of rate of delivery.

Figure 4A:
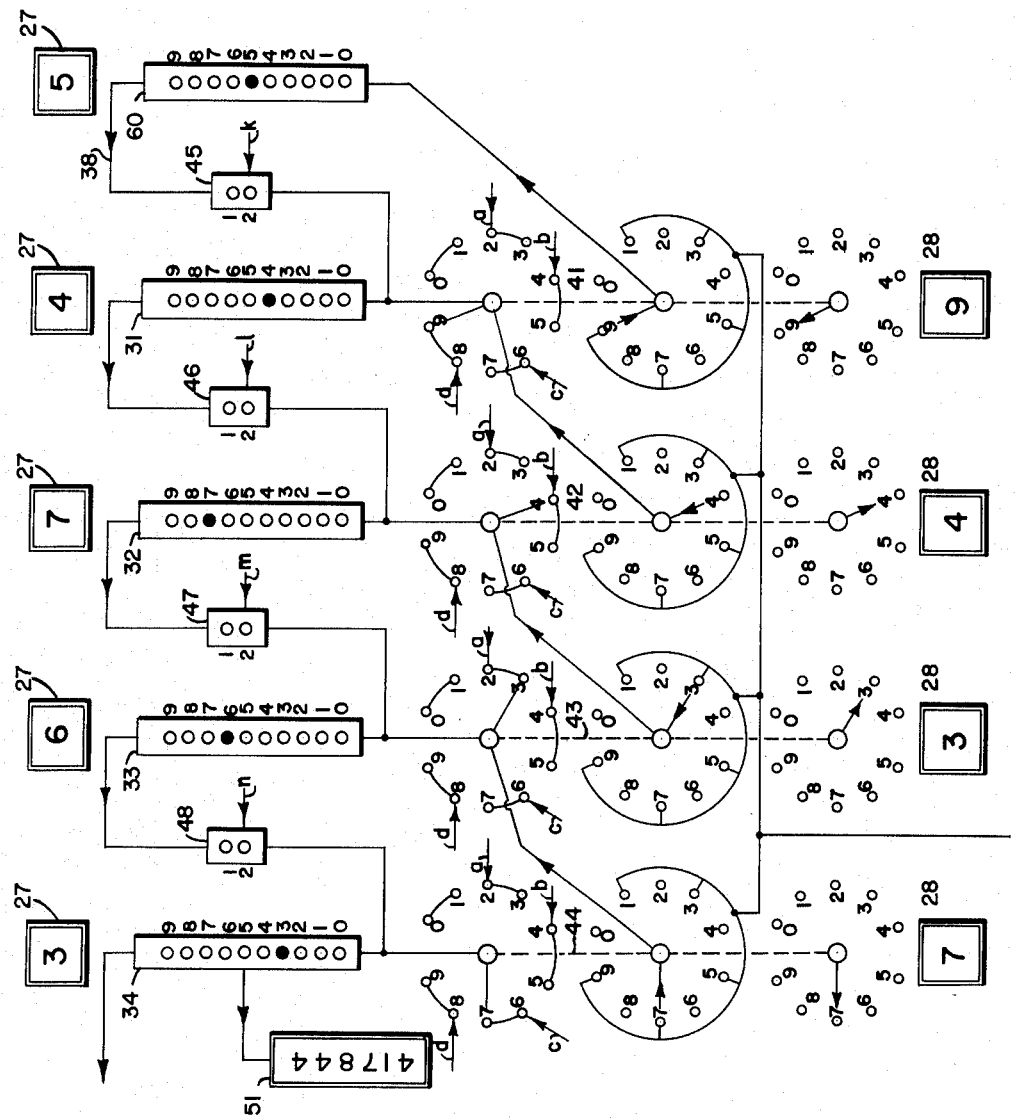

The device shown in FIGS. 4a and 4b is similar to that shown in FIGS. 3a and 3b, like elements again being designated by like reference numerals. Here, too, the price visually indicated is accurate only every five centiliters. This particular version is of interest because the modification shown in FIGS. 4a and 4b probably represents the optimum design achievable at moderate cost by the technical means available today.

In this device, the price is accurate only every five centiliters. The minimum pulse repetition rate required can therefore be reduced considerably.

As was explained in conjunction with the device of FIGS. 3a and 3b, the ring 30 of FIG. 4b must comprise at least thirteen tubes—nine for operation of the switches, and four for discharge of the storage elements 45–48. The minimum cycle of ring 30 is therefore thirteen pulses. If one pulse is applied to ring 30 for every half-centiliter, only ten pulses will be required to register five centiliters, and the ring cycle will not be completed every five centiliters. If instead ring 30 receives one pulse for every one-third of a centiliter, fifteen pulses will be required to register five centiliters, and the minimum cycle of ring 30 may be completed. In the embodiment represented by FIGS. 4a and 4b, the pulse pickup 10 therefore transmits three pulses per centiliter, and these pulses, shaped by the pulse-forming network 12, are passed to point 16 and from there simultaneously over line 17 and line 18.

The volume display device comprises a three-tube frequency divider 14 which reduces the pulse rate to one pulse per centiliter, its output being fed to decade 21.

The ring counter 30 is connected in FIGS. 4a and 4b as in the case of FIGS. 3a and 3b to switch groups 41, 42, 43 and 44, these groups being connected as described in our copending application Serial No. 189,167 above identified and particularly as represented by FIG. 5 thereof.

Since the cycle of ring 30 is fifteen pulses and the ring comprises thirteen tubes, two of the tubes in this ring may be idle. However, this tube complement makes it possible to arrange the connection in such a way that the discrepancy between the price visually indicated and the price actually accumulated occurring between consecutive displays of the exact price, i.e., between five centiliter multiples, is reduced to a minimum.

Figure 5A:
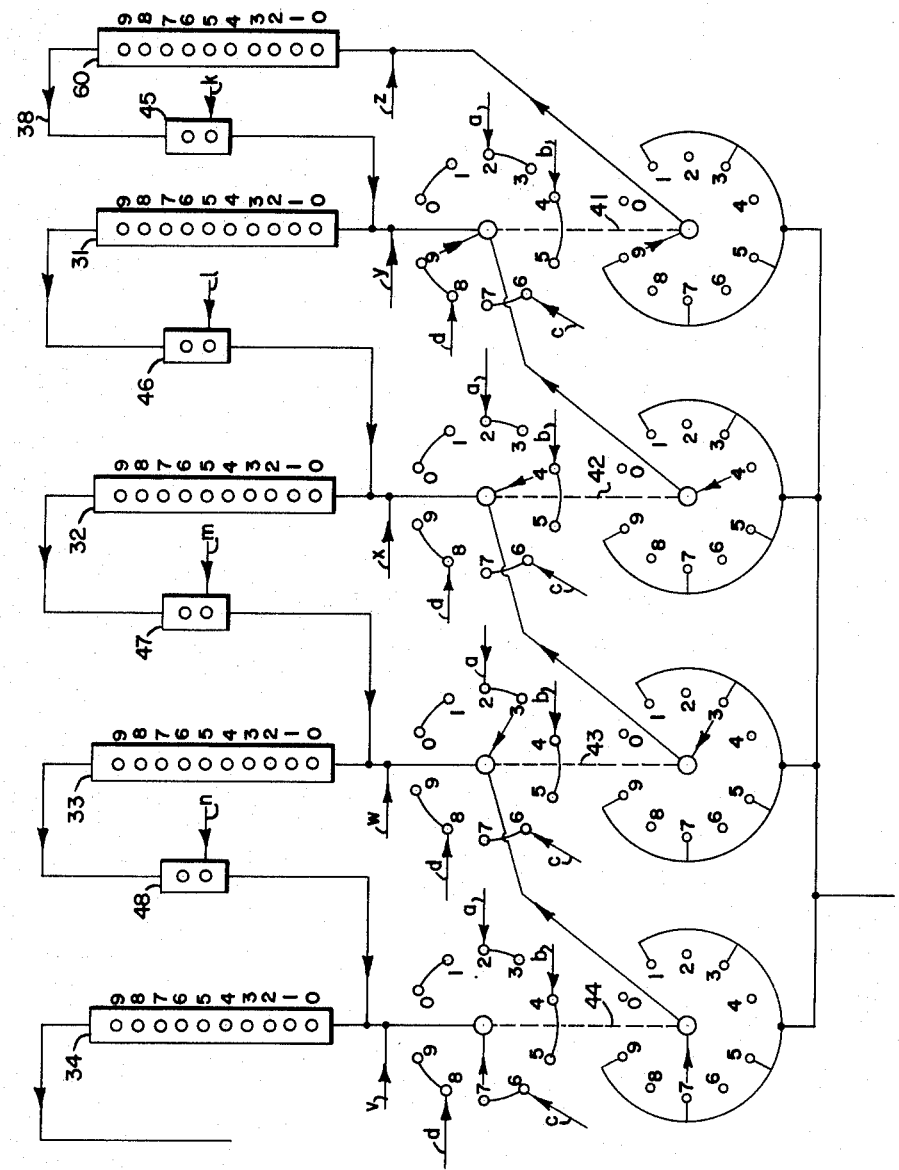
FIGS. 5a and 5b are a schematic diagram of a device similar to that represented by FIGS. 4a and 4b designed for a mixing apparatus for liquids.
Figure 5B:
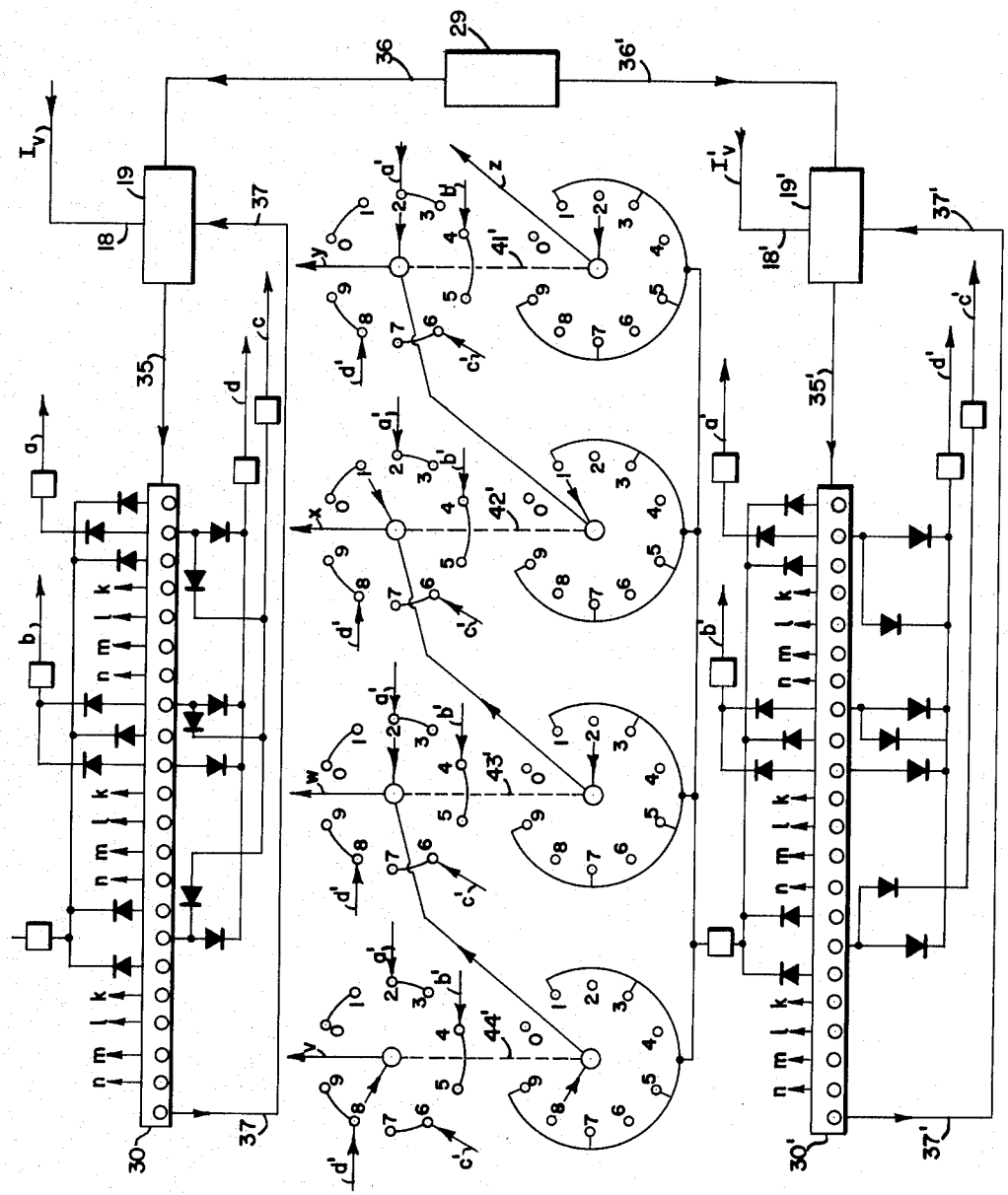

The embodiment shown in FIGS. 5a and 5b is similar to those already described except that it is designed for use in a mixing dispenser delivering a blend of two different products whose unit selling prices are different and which are to be mixed in any desired proportions.

In this device, two liquid pipes are provided, one for regular-grade gasoline, for instance, and the other for premium grade gasoline. Two volumetric meters and two pulse transmitters are inserted, one in each of these two fuel lines. The volumes are totalized by a single device which is identical with those described and which for that reason is not shown. Similarly, provision is made for a single, combined display of the aggregate price of the two liquids dispensed. Only this display device for the total price corresponding to the simultaneous delivery of the two liquids is shown in FIG. 5a and 5b.

In FIG. 5b, the volume pulses $I_v$ from the pickup (not shown) in the regular-grade fuel line travel over line 18 to gate 19, which then allows the pulses produced by pulse generator 29 to pass to ring 30. Ring 30 distributes the pulses to the individual decades 60, 31, 32, 33 and 34 by way of the switch groups 41, 42, 43 and 44.

Similarly, the volume pulses $I'_v$ from the pickup in the premium-grade fuel line travel along line 18' to gate 19', which then allows the pulses produced by pulse generator 29 to pass to ring 30'. The one pulse generator 29 serves both rings 30 and 30', but the pulses channeled through line 36' are out of phase with respect to the pulses channeled through line 36, the object being to avoid coincidence. Ring 30' distributes the pulses to the same, common decades 60, 31, 32, 33 and 34 by way of switch groups 41', 42', 43' and 44', which are connected in the same manner as the switch groups 41 to 44.

Since the volume pulses coming from ring 30 and those coming from ring 30' are out of phase with respect to one another, there is no danger of coincidence within decades 60, 31, 32, 33 and 34. However, since these decades receive signals from two rings at a time, several carries may be produced in a single cycle. To cope with this difficulty, rings 30 and 30' are designed in such a way that the storage elements 45–48 are discharged three times per cycle. The rings must therefore comprise nine tubes for operating the switches, three time four tubes for the storage elements, and one for closing the gate 19, or a total of 22 tubes.

Decades 60, 31, 32, 33 and 34 are adapted to accept twice as many pulses as the decades 60 and 31 to 34 shown in the preceding figures. It is therefore particularly important that the tubes of these decades have a high firing frequency. The circuit of FIGS. 13 and 14 may prove particularly advantageous in this application.

Figure 6:
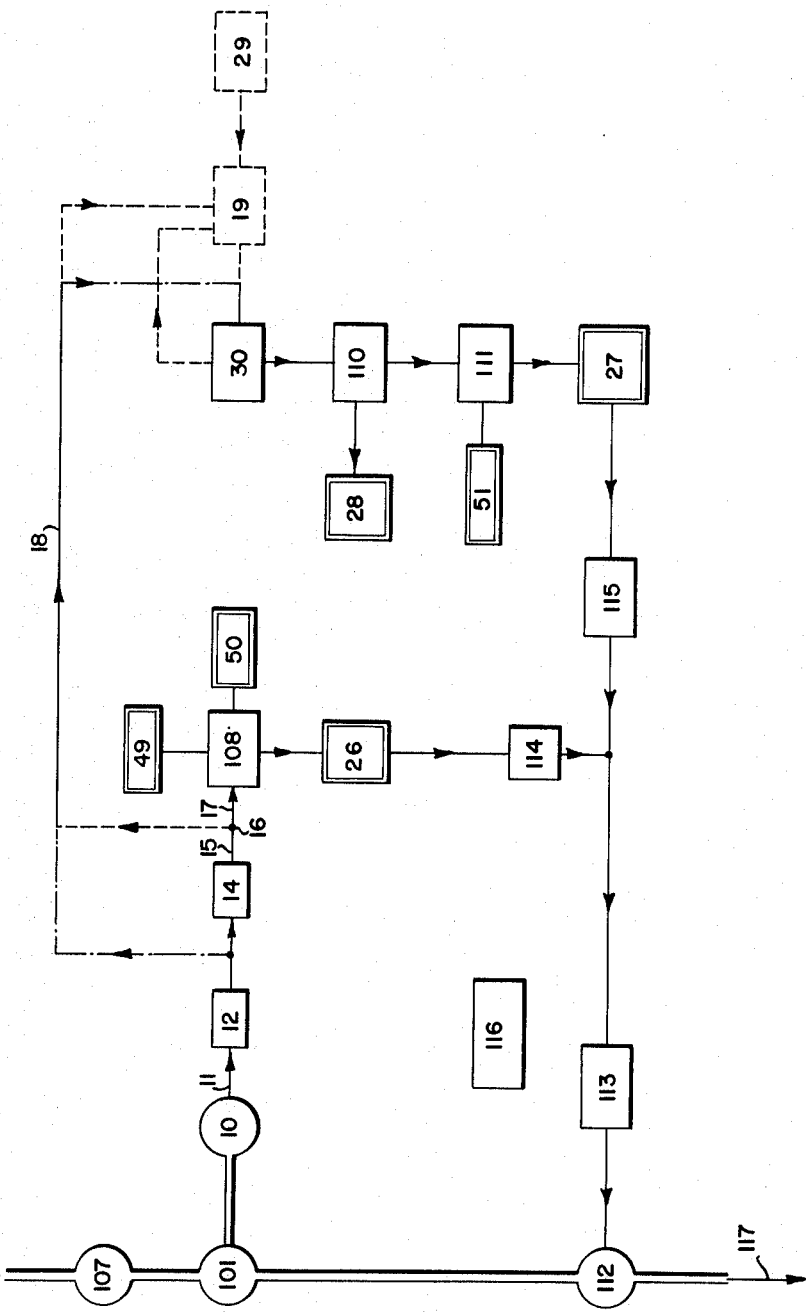
FIG. 6 is a block diagram of a liquid dispenser according to the present invention.

FIG. 6 is a block diagram showing the relative positions of the various components of a single-liquid fuel dispenser according to the invention.

In that figure, which represents a schematic synthesis of the various embodiments already described, the solid lines denote connections and elements common to all embodiments of FIGS. 1, 2, 3 and 4 while the broken lines represent connections and elements peculiar to the embodiments of FIGS. 1 and 3 and the dash-dotted lines signify connections and elements peculiar to the embodiments of FIGS. 2 and 4.

The fuel is introduced through a pipe 106, pumped by a pump 107, and measured by a volumetric meter 101 driving the disk 100 (FIG. 8) of a pulse transmitter or pickup 10. The pulses produced by the latter are fed into a line 11 and pass through a pulse-forming network 12 and a frequency divider 14, whose pulse output passes to a point 16 from where it is channeled simultaneously through lines 17 and 18.

Over line 17, these pulses drive the volume counter represented by block 108, the volume dispensed in each delivery being displayed in windows 26, and the volume delivered since the apparatus was first placed into service being visually indicated by totalizer 49, totalizer 50 being an emergency totalizer incorporated to provide against a power failure.

Over line 18, these pulses operate the gate 19, with the output of pulse generator 29 passing to ring 30 and to switch groups 41 to 44 (indicated by block 110), and with the signals coming from block 110 actuating the price pulse counter represented by block 111, the resulting price on a single delivery being presented in the windows 27, whereas the digits forming the unit price, defined by main switches 41a to 44a, appear in the windows 28. The total amount payable for the fuel sold since the apparatus was placed into service is displayed by totalizer 51.

To permit the delivery of the liquid to be stopped automatically when a predetermined price or volume has been reached, a solenoid valve 112 is provided downstream of volumetric meter 101. Said valve is actuated by a conventional solenoid 113 that is energized either by a volume-responsive presettable element 114 or by a price-responsive presettable element 115. Devices 114 and 115 are constructed of switches and logical circuits using diodes and electron tubes in a manner known to the art.

Block 116 represents the power supplies which, connected to the utility power lines, deliver the various voltages necessary to operation of the apparatus.

The dispensing hose and nozzle are indicated by arrow 117.

Figure 7:
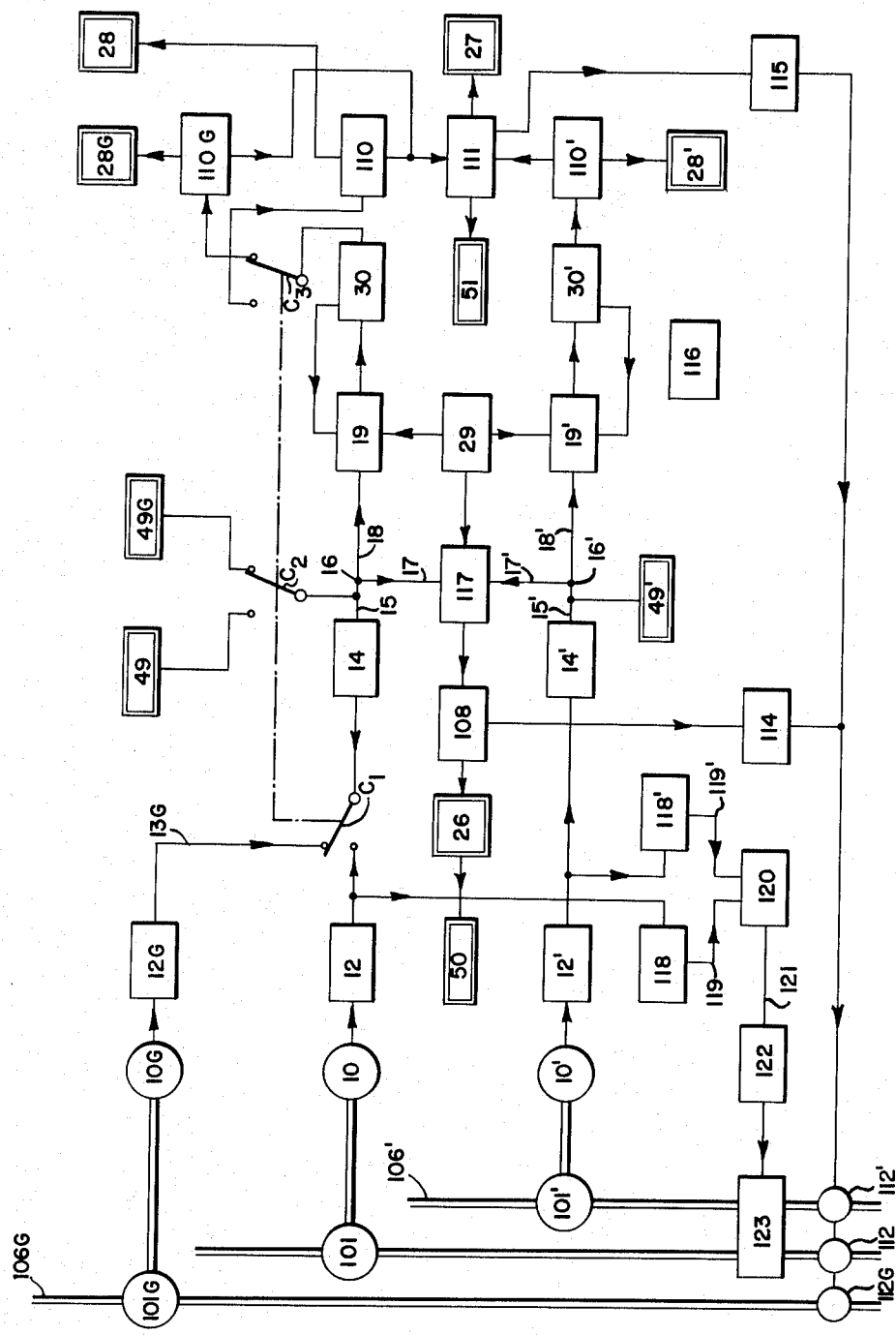
FIG. 7 is a block diagram of a multiliquid dispenser according to the present invention.

FIG. 7 is a block diagram showing the layout of the elements of a dispenser designed to deliver three basic products on the market today, namely, gas oil, regular-grade gasoline and premium-grade gasoline, the last two being adapted to be blended in any desired ratio during a fuel delivery.

The fuel inlet is through three pipes 106, 106' and 106G carrying regular-grade gasoline, premium-grade gasoline and gas oil, respectively. The three streams are measured by volumetric meters 101, 101' and 101G, which actuate pulse pickups 10, 10' and 10G, whose output pulses are shaped in pulse-forming networks 12, 12' and 12G.

*First case—delivery of gas oil:*—With the switches $C_1$, $C_2$ and $C_3$, which are suitably ganged, properly set, the pulse output of 10G passes by way of 13G to frequency divider 14. The output pulses of the latter are channeled both through line 17 to the dispensed-volume counting and indicating devices 108 and 26 and through line 18 to gate 19, from where the pulses produced by pulse generator 29 are fed to the ring 30 and to the switches 110G, set for the unit selling price of the gas oil, and through these switches the ring 30 then drives the price pulse counter 111, the resulting sales price being presented in the windows 27.

*Second case—delivery of regular-grade gasoline:*—With the switches $C_1$, $C_2$ and $C_3$ properly set, the pulses from 101 pass over the same route as the preceding ones. The switch groups 110 are then connected to ring 30.

*Third case—delivery of premium-grade gasoline:*—The volume pulses are channeled through line 17' and, in the embodiment shown, to a single volume pulse counter 108, this being the one driven in the preceding cases, and through line 18' to gate 19', with the pulse input to ring 30' then actuating, in the manner described in conjunction with FIG. 5, the common price readout devices 111 and 27 through switch groups 110'.

*Fourth case—delivery of a blend of regular-grade and premium-grade gasoline.*—The signals traveling along lines 15 and 15' reach points 16 and 16'. From there, the pulses are routed over lines 17 and 17' to the common pulse counter 108. To prevent these pulses from becoming superimposed, an anticoincidence device 117 of a known type which is analyzed sequentially by pulse generator 29 is provided in lines 17 and 17' ahead of counter 108. After passing through this anticoincidence device, the regular-grade and premium-grade gasoline volume pulses drive the counter 108, the total volume dispensed being displayed in the windows 26. Over lines 18 and 18', the pulses actuate the device shown in FIG. 5, the total price of the delivery being displayed in the windows 27.

The desired mixing ratio is maintained as follows: The volume-pulse output of 12 and 12' is fed to devices 118 and 118', respectively. These devices consist of ring counters employing preferably cold-cathode thyratrons. These counters are connected to count on bases corresponding to the volume ratio of the two products going into the blend. The function of these ring counters is similar to that of the frequency dividers. For example, if the mixing ratio is to be 3 liters of regular-grade gasoline to 2 liters of premium-grade gasoline, ring 118 is wired in such a way that it delivers, over line 119, one output pulse for every three input pulses; and ring 118' is wired so that its output over line 119' is one pulse for every two input pulses. These connections are established by a ganged arrangement permitting the desired mixing ratio to be selected by a single manual operation.

The devices 118 and 118' are connected by lines 119 and 119' to a bidirectional counter 120, which may be of any suitable known type. If the mixing ratio is maintained, the repetition rates of the output pulses from 118 and 118' which are fed to 120 through lines 119 and 119' will be equal, and no voltage will appear at output 121. If the number of pulses received at one of the inputs to 120 differs from the number of pulses received at the other input, unbalance is produced and a voltage appears at output 121 to actuate, through an amplifier 122, the mixing valve 123.

The volume and price presettable elements 114 and 115, identical with those of FIG. 6, actuate, through servo motor device 113, the valves 112C, 112 and 112'.

In the embodiment represented by FIG. 7, the price-computing devices comprise a pulse generator 29 and gates 19 and 19'. However, it will be understood that the invention also applies to a mixing dispenser wherein the price-computing devices do not make use of gates nor of a pulse generator.

In all embodiments described, the parameter on the basis of which a quantity proportional to the measured quantity is computed is the selling price per unit volume, the measured quantity being the volume and the proportional quantity being the total price of the quantity measured. However, the invention is obviously not limited to this particular case; the parameter may be any other desired parameter, and particularly the density of the quantity measured, the quantity proportional to the quantity measured being in that case the total weight of said quantity.

Referring again to FIG. 3, reference characters 41a to 44a identify four pointers settable to ten positions 0 to 9. Each of these pointers is fixedly coupled to the wipers or rotatable contacts of two ten-position switches 41b and 41c, 42b and 42c, etc. Otherwise stated, each of reference characters 41 to 44 identifies in FIG. 3, a ganged switch having an a-deck acting as a pointer, and a b-deck and a c- deck each having ten stationary contacts 0 to 9 and a rotating contact or wiper. The odd-positioned stationary contacts at each of decks 41b, 42b, 43b and 44b are all connected to line e of counter 30, and thus receive five pulses during each cycle of that counter. The rotatable contact of each of switches 41b to 44b is connected to the rotatable contact or wiper in the c-deck of the switch of adjacent lower order, except that the wiper of deck 41b connects directly to the pulse input to a counter 60 which is provided to indicate remainders, when present, in the division by two which is performed by switches 41 to 44 of FIG. 3 upon the price per unit volume set up at the rotatable contacts or wipers of switch decks 41a to 44a.

The ten stationary contacts of each of switch decks 41c to 44c are moreover connected to lines a to d so as to receive from counter 30 on every cycle of the latter a number of pulses equal to the quotient (ignoring fractional remainders of one half, when present) of the value 0 to 9 of the position of those contacts respectively when divided by two. Thus the fixed contacts at positions 0 and 1 receive zero pulses and are not connected to any of lines a to e, while the fixed contacts of positions 2 and 3 receive one pulse from line a, those at positions 4 and 5 receive two pulses from line b, and so on, the fixed contacts at positions 8 and 9 receiving four pulses from line d. With this construction, each cycle of counter 30 in FIG. 3 results in the addition into the set of counters 60, 31, 32, 33, 34 of that figure of a number equal to one half the number set up by the pointers at decks 41a, 42a, 43a, 44a, and this means addition into those counters of five times the price per unit volume set up at those pointers. Specifically, the price per unit volume set up in FIG. 3 is 7349 representing 73.49 francs per liter, or 0.7349 franc per centiliter (hundredth of a liter). The unit volume of sale however is five centiliters (5 cl.) one volume being delivered from divider 14 for every 5 cl. delivered. Thus counter 30 goes through one cycle for every 5 cl. delivered. Each cycle of counter 30 therefore results in addition into counters 60, 31–34 of a number equal to five times the price per centiliter.

Considering one cycle of counter 30 in detail, the pulse delivered at line a passes into counter 33 via switch deck 43c where the rotatable contact is at position 3. The two pulses on line b pass into counter 32 at switch deck 42c where the rotatable contact is at position 4. The three pulses on line c pass into counter 34 from the switch deck 44c where the rotatable contact is at position 7. The four pulses on line d pass into counter 31 at switch deck 41c where the rotatable contact is at position 9. The five pulses on line e which are applied to the odd-positioned stationary contacts at each of switch decks 41b–44b pass directly into counter 60 since the rotatable contact at deck 41b is at position 9. In addition they pass into counter 3 since the rotatable contact of deck 43b is at the odd-numbered position 3 and they likewise pass into counter 33 since the rotatable contact of deck 44b is at the odd-numbered position 7. Consequently at the end of the cycle of counter 30, the counts in counters 34, 33, 32, 31 and 60 have been raised by the quantities 3, 6, 7, 4 and 5 respectively. This number, 36745, is five times the price per unit volume 0.7349 franc per hundredth of a liter and therefore represents the proper increment to the price to be paid displayed at the windows of FIG. 3 for a five hundredths liter increment in the quantity of fuel delivered.

In FIG. 4 the arrangement of switches 41 to 44 and of counters 60, 31 to 34, is the same as that shown in FIG. 3. Since however the embodiment of FIG. 4 dispenses with the gate 19 and the pulse generator 29, and since again the embodiment of FIG. 4, like that of FIG. 3, is to compute a sales price as a multiple of the price of a five centiliter increment of fuel, means must be provided so that the counter 30 of FIG. 4 will go through one cycle for a five centiliter increment in delivered fuel just as in the embodiment of FIG. 3. This result is achieved by constructing the pulse generating unit 10 to develop three pulses per centiliter and by constructing the counter 30 to have a fifteen-pulse cycle. In contrast, the counter 30 of FIG. 3 may operate with a fourteen-pulse cycle and is so shown in FIG. 3. In embodiments such as those of FIGS. 1, 3 and 5 which include a gate 19 and a separate free-running pulse generator 29, it is necessary only that the cycle of the counter 30 be completed after initiation by one input pulse to the gate 19 over line 18 before the arrival of the next pulse over line 18, and there is no necessary relation of phase between the output pulses of the counter 30 and the triggering pulses on line 18 which each serve to open gate 19.

In contrast, in embodiments such as that of FIGS. 2 and 4 the counter 30 is stepped from position to position by the pulses applied thereto from line 18. Hence in FIG. 2 where it is desired to step the counter 30 through a complete cycle for every centiliter delivered, the pulse-forming unit 10 is constructed to develop during the delivery of one centiliter exactly as many pulses as are required to step the counter 30 through a complete cycle, namely 12. Similarly in FIG. 4 where it is desired to step the counter 30 through a complete cycle during the delivery of five centiliters of fuel, the desired result is obtained by giving to the counter 30 fifteen stages as indicated in FIG. 4 and by constructing the pulse-forming device 10 to develop fifteen pulses during the delivery of five centiliters. It will be noted that in FIG. 4 the first pulse output of counter 30 is not used. Fourteen pulse outputs are required, ten for proper supply of the lines a to e and four more for the storage devices 45 through 48.

In FIG. 1 lines a to e have been connected in suitable combinations to the first nine stages 1 to 9 of counter 30 with stages ten, eleven and twelve employed to drive the lines k, l and m which lead to the three storage devices 43, 45 and 47. A thirteenth stage has been provided to supply a pulse for closing gate 19, counter 30 being then in condition to be stepped to its first stage upon arrival of the next pulse from generator 29 when gate 19 is reopened by the next pulse on line 18.

In FIGS. 2 and 3 the necessary feeds of one, two, three, four and five pulses from lines a to e have again been extracted from the first nine stages of counter 30. In FIG. 4 ten stages numbered two through eleven have been employed for this process, and in FIG. 5 nine stages have been so employed, suitably spread out through the cycle of the counters 30 and 30' of FIG. 5.

In FIG. 4 the switches 41 to 44 are identical with the switches 41 to 44 of FIG. 3.

In FIG. 5 the switches 41 to 44 may be identical with the switches 41 to 44 of FIGS. 3 and 4, although they have been shown in FIG. 5 without the a-decks thereof which perform simply an indicating function for the operator in setting up the switches to show the price per liter. In FIG. 5 switches 41' to 44' are identical in construction with the switches 41 to 44 of FIG. 5. They have been set up for a price of 82.12 francs per liter of the premium grade fuel whose delivery is indicated by the pulses I'$_v$ arriving on line 18.

From the foregoing it will be seen that applicants have provided metering and computing apparatus, as for example for the metering of a liquid and computation of the price thereof, including means 10 to generate pulses at a rate proportional to the quantity of liquid metered, means to totalize those pulses for indication of the quantity metered, a plural order counter including decades 31 to 34 in FIGS. 1 to 5 and means to develop, for each occurrence of a selected number of pulses from the pulse generating unit 10, a sequence of second pulses at the outputs of the ring counter 30 of FIGS. 1 to 5 which second pulses are distributed by means of the switches 41 to 44 so as to deliver selectable numbers of those second pulses to each order of the plural order counter, according to the settings of those switches. Such distribution takes place for each cycle of the counter 30. The invention has been illustrated in terms of a plural order counter operating on the decimal system of numbers but it is applicable to other number systems of base $n$. In either case, the pulse developing means 30 with gate 19 and oscillator 29, when present, develops at least $n-1$ pulses for each pulse or multiple of pulses from the pulse generating means 10 which is to cause addition of a price increment into the plural order counter. Applicants have further provided such apparatus in which carry transfer means such as the counter 45 to 47 of FIGS. 1 and 2 are provided between adjacent orders of the plural order counter and in which on each cycle of operation of the generator 30 of second pulses, there are developed pulses separate in time from those delivered into the plural order counter for actuating these carry transfer means.

Further in accordance with the invention, applicants have provided metering and computing apparatus in which, as illustrated in FIGS. 3, 4 and 5, for each occurrence of a selected number of pulses from the device 10, which selected number is one in FIG. 3 and fifteen in FIG. 4, and which is representative of an increment of (in those figures) five unit quantities of liquid metered, a switching or pulse distributing system which effects addition into the plural order counter of a number of pulses representative of five times the settings of those switches. The invention is obviously not limited to the number five in this respect, switches 41 to 44 of FIGS. 3, 4 and 5 being adaptable by suitable rearrangement of their contacts with respect to the output lines of counter 30 to effect multiplication by a number other than five. In certain of the appended claims, the invention has been defined as operating thus for each occurrence of a selected number of pulses from the pulse generating unit 10 representative of an increment of $m$ unit quantities of material metered.

Applicants have further provided apparatus for making computations of the kind hereinabove described with respect to plural quantities and totalizing them in a single counter. As illustrated in exemplary fashion in FIGS. 5 and 7 for the case of simultaneous delivery of fuel from two separate sources, the two fuels being sold at different unit prices, such an embodiment of the invention may include not only means to compute and totalize in a single plural order counter the sales price of the two volumes of fuel but also means for maintaining the flow of fuel in the two lines in predetermined proportions. To this end, the pulses representative of fuel flowing in the two lines are separately subjected to frequency division at differing factors corresponding to the ratio of fuel delivery rates desired, with inequality in the rate of appearance of the quotient pulses from these two frequency dividing operations being employed via a servo mechanism to reset valves in the two fuel lines so as to maintain the rates of flow in the two fuel lines at the desired relative values.

While the invention has been described herein in terms of a number of preferred embodiments, the invention is not limited thereto, the scope of the invention being rather set forth in the appended claims.

We claim:

1. Metering and computing apparatus comprising means to generate a succession of first pulses proportional in number to the quantity of material metered, means to totalize said first pulses for indication of the quantity of material metered, a plural order decimal counter, carry means between adjacent orders of said counter, means to develop cyclically, for each occurrence of a selected number of said first pulses representative of an increment of five unit quantities of material metered, a sequence of at least nine second pulses, and a separate ten-position switch for each of said orders coupled between said last-named means and a separate order of said counter, each of said switches including ten stationary terminals connected to the outputs of said pulse generating means to receive on each cycle of said pulse generating means a number of pulses equal to the integral part of one half the number of the position of such contact in the positional series 0 to $n-1$, a first movable contact engageable with said ten stationary contacts and with the input to the counter of its order, five stationary contacts connected to said pulse generating means to receive five pulses on each cycle of said pulse generating means and a second movable contact engageable with the first movable contact of the switch of adjacent lower order and with one of said five stationary contacts for odd-numbered positions of said first-named first movable contact.

2. Metering and computing apparatus comprising means to generate a succession of first pulses proportional in number to a quantity metered, means to totalize said first pulses for indication of the quantity metered, a plural order counter, carry storage means between adjacent orders of said counter, oscillator means for continuously producing a succession of second pulses at a rate greater than the maximum rate of production of said first pulses, a single order counter, a gate circuit coupled between said oscillator means and said single order counter, said gate circuit being further coupled to said first pulse generating means and being arranged to be opened by every $n$th pulse from said first pulse generating means and to be closed by every $k$th pulse from said single order counter, $n$ being an integer greater than zero and $k$ being an integer greater than $n$, separate switch means for each order of said plural order counter to deliver from said single order counter on each $k$ pulse cycle thereof a selectable number of said second pulses, and means to deliver a carry transfer pulse to each of said carry storage means on each cycle of said single order counter.

3. Liquid metering and price computing apparatus comprising liquid metering means, means to generate a succession of first pulses proportional in number to the quantity of liquid metered, means to totalize said first pulses to provide an indication of the quantity of liquid metered, a plural order counter, oscillator means for continuously producing a succession of second pulses, a single order counter, a gate circuit coupled between said oscillator means and said single order counter, said gate circuit being arranged to be opened by pulses from said succession of first pulses and to be closed by pulses from said single order counter, separate switch means coupled between said single order counter and each order of said plural order counter, said switch means being settable to deliver to the associated order of said plural order counter a selectable number of pricing pulses from said single order counter, and separate numerical display means coupled to said totalizing means and to each order of said plural order counter for displaying, as each said first pulse is totalized, the total quantity of liquid metered and the total price of liquid metered.

4. Metering and computing apparatus comprising means to generate first pulses proportional in number to the quantity metered, a plural order counter, a single order ring counter, means coupling said first pulse generating means to said ring counter to drive the ring counter through a cycle for a fixed number of said first pulses, a plurality of less than nine conductors, means connecting the stages of said ring counter to deliver to each of said conductors during one cycle of said ring counter pulses in a separate one of the numbers from 1 to 9, nine terminals, means interconnecting said conductors to deliver to each of said terminals during each cycle of said ring counter pulses in a separate one of the numbers from 1 to 9, and means to connect any one of said terminals to the input of each order of said plural order counter, the stages connected by said connecting means to any one of said conductors being nonconsecutive stages of said ring counter.

References Cited by the Examiner

UNITED STATES PATENTS

| | | | |
|---|---|---|---|
| 1,157,625 | 10/1915 | Heuser | 235—92 |
| 2,503,127 | 4/1950 | Mumma | 235—92 |
| 2,528,394 | 10/1950 | Sharpless et al. | 235—92 |
| 2,937,337 | 5/1960 | Jones et al. | 235—92 |
| 2,963,222 | 12/1960 | Allen | 235—151 |
| 3,043,508 | 7/1962 | Wright | 235—160 |
| 3,055,585 | 9/1962 | Bell et al. | 235—160 |
| 3,081,031 | 3/1963 | Livesay | 235—160 |

OTHER REFERENCES

June 1958, "The Digiverter—a Digital Readout Converter" by Finney, from "Instruments and Automation," Vol. 31, No. 6.

MALCOLM A. MORRISON, *Primary Examiner.*